US008848006B2

(12) United States Patent
Wetzstein et al.

(10) Patent No.: US 8,848,006 B2
(45) Date of Patent: Sep. 30, 2014

(54) TENSOR DISPLAYS

(71) Applicants: Gordon Wetzstein, Cambridge, MA (US); Douglas Lanman, Somerville, MA (US); Matthew Hirsch, Somerville, MA (US); Ramesh Raskar, Cambridge, MA (US)

(72) Inventors: Gordon Wetzstein, Cambridge, MA (US); Douglas Lanman, Somerville, MA (US); Matthew Hirsch, Somerville, MA (US); Ramesh Raskar, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 55 days.

(21) Appl. No.: 13/736,769

(22) Filed: Jan. 8, 2013

(65) Prior Publication Data
US 2014/0063077 A1  Mar. 6, 2014

Related U.S. Application Data

(60) Provisional application No. 61/590,507, filed on Jan. 25, 2012.

(51) Int. Cl.
*G09G 5/10* (2006.01)
*G09G 3/34* (2006.01)

(52) U.S. Cl.
CPC .................................. *G09G 3/3406* (2013.01)
USPC ........... 345/690; 345/664; 345/679; 345/102; 349/15

(58) Field of Classification Search
CPC ........... G02F 1/29; G02F 1/1335; G09G 5/10; G09G 3/3406
USPC ............. 348/53–60; 349/15, 69, 70; 345/102, 345/653, 664, 679, 690; 359/320
See application file for complete search history.

(56) References Cited

U.S. PATENT DOCUMENTS

| 7,872,707 | B1 * | 1/2011 | Sutherland et al. ............. 349/86 |
| 8,427,393 | B2 * | 4/2013 | Nakazaki et al. ................. 345/5 |
| 2009/0040426 | A1 | 2/2009 | Mather et al. |
| 2009/0213147 | A1 * | 8/2009 | Sagardoyburu et al. ...... 345/690 |
| 2009/0219305 | A1 * | 9/2009 | Diederiks et al. ............. 345/690 |
| 2011/0176073 | A1 * | 7/2011 | Chang et al. ................... 349/15 |
| 2011/0235719 | A1 * | 9/2011 | Antonini et al. ......... 375/240.22 |

OTHER PUBLICATIONS

Author: 3M; Title: 3M Enhances 3D Display Capabilities for Handheld Displays with 3D Optical Film, 2009, posted at http://news.3m.com/press-release/company/3m-enhances-3d-display-capabilities-handheld-displays-3d-optical-film.
Acar, E., Kolda, T., Dunlavy, D., Morup, M., Scalable Tensor Factorizations for Incomplete Data, 2010, arXiv:1005.2197.

(Continued)

*Primary Examiner* — Lun-Yi Lao
*Assistant Examiner* — Kelly B Hegarty
(74) *Attorney, Agent, or Firm* — Stephen R. Otis

(57) ABSTRACT

In exemplary implementations of this invention, an automultiscopic display device includes (1) one or more spatially addressable, light attenuating layers, and (2) a controller which is configured to perform calculations to control the device. In these calculations, tensors provide sparse, memory-efficient representations of a light field. The calculations include using weighted nonnegative tensor factorization (NTF) to solve an optimization problem. The NTF calculations can be sufficiently efficient to achieve interactive refresh rates. Either a directional backlight or a uniform backlight may be used. For example, the device may have (1) a high resolution LCD in front, and (2) a low resolution directional backlight. Or, for example, the device may have a uniform backlight and three or more LCD panels. In these examples, all of the LCDs and the directional backlight (if applicable) may be time-multiplexed.

20 Claims, 9 Drawing Sheets

(56) References Cited

OTHER PUBLICATIONS

Blondel, V., Ho, N., Van Dooren, P., Weighted Nonnegative Matrix Factorization and Face Feature Extraction, 2008, Image and Vision Computing, 1-17.

Casner, G., Anderson, N., Lathrop, A., Bryan, W., Schultz, J., Autostereoscopic Viewing Freedom, 2011, 3M Optical Systems Division, posted at http://65.38.182.180/Portals/displayweek/Files/9.3.pdf.

Chen, C., Yeh, Y., Shieh, H., 3-D Mobile Display Based on Moiré-Free Dual Directional Backlight and Driving Scheme for Image Crosstalk Reduction, 2008, Journal of Display Technology, vol. 4, issue 1, pp. 92-96.

Gotoda, H., A multilayer liquid crystal display for autostereoscopic 3D viewing, 2010, SPIE Stereoscopic Displays and Applications XXI, SPIE vol. 7524, pp. 1-8.

Kim, Y., Kim, J., Kang, J., Jung, J., Choi, H., Lee, B., Point light source integral imaging with improved resolution and viewing angle by the use of electrically movable pinhole array, 2007, Optics Express, vol. 15, No. 26, pp. 18253-18267.

Lanman, D., Hirsch, M., Kim, Y., Raskar, R., Content-adaptive parallax barriers: Optimizing dual-layer 3D displays using low-rank light field factorization, 2010, ACM Trans. Graph. (SIGGRAPH Asia) 29, 163:1-163:10.

Lee, D., Seung, H., Learning the parts of objects by non-negative matrix factorization, 1999, Nature 401, 6755, 788-791.

Loukianitsa, A., Yarovoy, A., Kanashin, K., 2005, Tri-stack 3D LCD Monitor, In SPIE Stereoscopic Displays and Virtual Reality Systems XII, vol. 5664, 241-246.

Morup, M., Hansen, L., Parnas, J., Arnfred, S., Decomposing the time-frequency representation of EEG using non-negative matrix and multi-way factorization, 2006, Tech. rep.

Stolle, H., Olaya, J., Buschbeck, S., Sahm, H., Schwerdtner, A, Technical solutions for a full resolution autostereoscopic 2D/3D display technology, 2008, In Proc. SPIE, 1-12.

Travis, A., Autostereoscopic 3-D display, 1990, Applied Optics 29, 29, 4341-4342.

Travis, A., Large, T., Emerton, N., Bathiche, S., Collimated light from a waveguide for a display backlight, 2009, Optics Express 17, 22, 19714-19719.

\* cited by examiner

TENSOR DISPLAYS

RELATED APPLICATIONS

This application is a non-provisional of, and claims the benefit of the filing date of, U.S. Provisional Application Ser. No. 61/590,507, filed Jan. 25, 2012, the entire disclosure of which is herein incorporated by reference.

STATEMENT REGARDING FEDERALLY SPONSORED RESEARCH OR DEVELOPMENT

This invention was made with U.S. government support under: (i) grant IIS-1116452, awarded by the National Science Foundation; and (ii) awards 10-DARPA-1102, N66001-10-1-4041, and P.O. 10320917, awarded by the Defense Advanced Research Projects Agency. The government has certain rights in this invention.

FIELD OF THE TECHNOLOGY

The present invention relates generally to 3D displays.

SUMMARY

In exemplary implementations of this invention, a display device produces a 3D image. The device comprises a stack of spatially-addressable light attenuating layers.

A controller performs calculations in order to control the device. In these calculations, tensors provide sparse, memory-efficient representations of a light field. The calculations include using weighted nonnegative tensor factorization (NTF) to solve an optimization problem. The tensor calculations may employ multiplicative update rules, and may be sufficiently efficient to achieve interactive refresh rates.

In exemplary implementations of this invention, a tensor display has N spatially addressable light attenuating layers and displays a temporal sequence of M frames. If the tensor display has a uniform backlight, the light field that it emits may be represented by $N^{th}$-order, rank-M tensor. If the tensor display has a directional backlight, the light field that it emits may be represented by a rank-M tensor with an order equal to N+1 (where N does not count any spatially addressable light attenuating layers in the directional backlight itself). The controller performs calculations that involve such a tensor.

In exemplary implementations, the display device is automultiscopic: a viewer can see the 3D effect without wearing glasses. The 3D display appears different from different viewing angles, and thus exhibits both binocular disparity and motion parallax, which are cues for depth perception. Thus, the display device creates the illusion of looking at an actual 3D scene.

In exemplary implementations, the display device includes (1) at least one spatially addressable light attenuating layer, and (2) a backlight. For example, each layer may comprise a liquid crystal display (LCD) layer. Light from the backlight is transmitted through the layer(s). The layer(s) are time-multiplexed: i.e., configured to produce a time-multiplexed image, in which a sequence of frames is shown at a rate equal to or faster than the flicker fusion frequency. This causes a human viewer to perceive a time average of the frames.

In exemplary implementations of this invention, the controller comprises one or more processors. Using weighted NTF, the controller calculates an optimal set of attenuations induced in light at respective pixels in the layers in the stack. If the backlight is directional, the optimal set may also include angles of light rays emitted by respective pixels of the backlight. The controller outputs control signals that cause the display device to produce this optimal set of attenuations (and light ray angles, if applicable) on a per pixel basis. Thus, the controller causes the device to output a light field that optimally approximates the target light field. If a human looks at the outputted light field without special glasses, the human perceives a 3D image.

In exemplary implementations of this invention, the directional backlight is effectively a low resolution light field display. This directional backlight can control the angle of light that it emits, and can be used with an arbitrary number of light attenuator layers (e.g., one or more such layers).

Here are two examples of a tensor display with a directional backlight.

In the first example, a purely angular backlight illuminates a single spatially addressable, light attenuating layer. The light attenuator layer comprises an LCD layer. The purely angular backlight can vary the angle of light that it emits, but does not have spatially addressable light attenuating pixels. Both the light attenuator layer and the purely angular backlight are time-multiplexed.

In the second example, the tensor display includes two spatially addressable light attenuator layers: (1) a high spatial resolution LCD in front, and (2) a secondary LCD layer in back. The secondary LCD layer is part of the directional backlight. Again, both the front LCD and the backlight are time-multiplexed.

In this second example, the directional backlight may comprise, from back to front: (1) an array of cold-cathode fluorescent lamps (CCFLs); (2) one or more lenses; and (3) the secondary LCD layer, positioned at a distance from the lens(es) equal to the focal length of the lens(es). By controlling which of the CCFLs behind the lens(es) are lit, the angle of light transmitted through respective pixels in the secondary LCD can be controlled.

Alternately, other types of light emitters may be used in the directional backlight. For example, the CCFLs may be replaced with other light-emitting devices, including light-emitting diodes (LEDs), including organic light-emitting diodes (OLEDs). Alternately, the stack of light attenuating layers may comprise two or more LCD layers, in addition to any LCD layer that is part of the directional backlight.

In some implementations, the display device is illuminated by a uniform backlight. For example, the stack may comprise two, three or more layers, where each layer is a spatially addressable light attenuator and none of the layers are part of the uniform backlight.

As used herein, a "tensor display" is an automultiscopic display device wherein: (1) the device includes one or more spatially addressable, light attenuating layers; (2) the device includes a controller, which is configured to perform calculations to control the device; and (3) the calculations involve using weighted NTF.

In exemplary implementations of this invention, time-multiplexed tensor displays have many practical advantages. For example, such tensor displays can be brighter than existing automultiscopic displays. Further, such tensor displays may have wider fields of views, greater depths of field and thinner form factors than existing automultiscopic displays. For these reasons, such tensor displays are well suited for producing 3D displays in mobile devices, such as tablets, smartphones and cell phones. More generally, tensor displays may be used in any flat screen display device, including in a monitor for (i) a personal computer (PC), (ii) a laptop computer, or (iii) home theater.

Tensor-based calculations can be used in a wide variety of architectures. Among other things, these calculations can be used to control an arbitrary number of light attenuating layers (e.g., two, three, four or more layers) and, if the backlight is directional, to control angle of light emitted by the backlight.

The description of the present invention in the Summary and Abstract sections hereof is just a summary. It is intended only to give a general introduction to some illustrative implementations of this invention. It does not describe all of the details of this invention. This invention may be implemented in many other ways.

Figure 1:
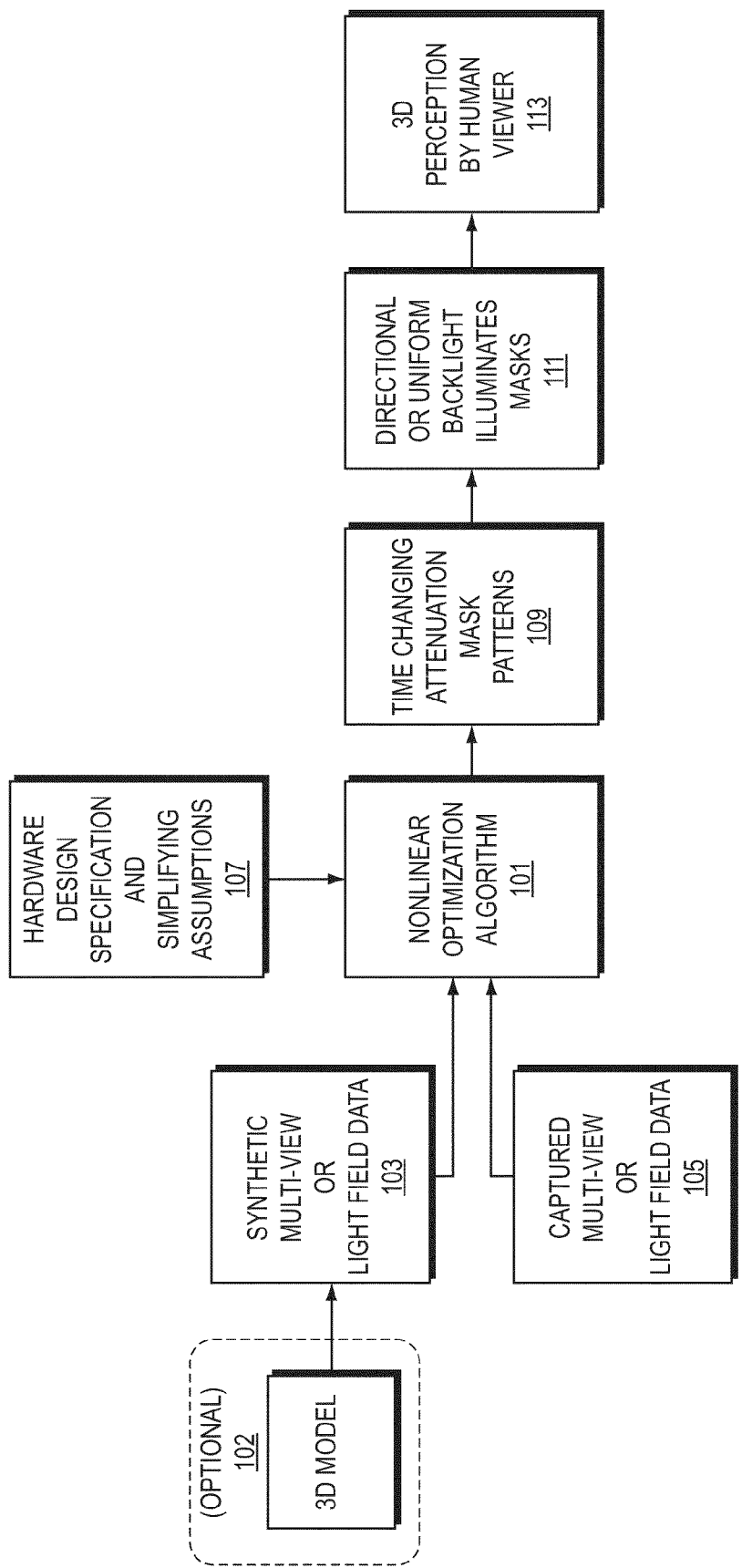
FIG. 1 is a flow chart for a tensor display.

The above Figures illustrate some illustrative implementations of this invention, or provide information that relates to those implementations. However, this invention may be implemented in many other ways. The above Figures do not show all of the details of this invention.

DETAILED DESCRIPTION

In exemplary implementations, this invention comprises a tensor display, i.e., an automultiscopic display device wherein: (1) the device includes one or more spatially addressable, light attenuating layers; (2) the device includes a controller, which is configured to perform calculations to control the device; and (3) the calculations involve using weighted NTF. Tensor displays can be illuminated by either uniform or directional backlighting (e.g. a low-resolution light field emitter).

In exemplary implementations of this invention, an N-layer, M-frame tensor display is illuminated by a uniform backlight, and the light field that it emits can be represented by an $N^{th}$-order, rank-M tensor. The light field tensor is decomposed as a sum of M rank-1 tensors, each corresponding to the outer product of N masks representing the transmittance of each layer for each frame. (If the backlight is directional, then the tensor display emits a light field that can be represented by N+1-order, rank-M tensor, where N does not count any spatially addressable light attenuating layers in the directional backlight itself). Using this representation, a unified optimization framework based on nonnegative tensor factorization (NTF) may be applied to a wide variety of tensor display architectures. For example, this NTF optimization framework may be employed for tensor display architectures comprising: (1) multiple, time-multiplexed layers with directional backlighting; (2) multiple, time-multiplexed layers with uniform backlighting, (3) static, multilayer displays with three or more layers and uniform backlighting, (4) two-layer, temporally-multiplexed displays, or (5) a full resolution 2D mode (in which all but one of the layers is rendered transparent).

Advantageously, this NTF optimization framework allows joint multilayer, multiframe light field decompositions. Such decompositions significantly reduce artifacts observed with prior multilayer-only and multiframe-only decompositions.

In a prototype of this invention, a tensor display includes modified LCD panels and a custom integral imaging backlight. In this prototype, an efficient, GPU-based NTF implementation enables interactive applications.

In exemplary implementations, the one or more layers act as a compressive display. Imagery sent to the display is compressed. But it is compressed in a way that allows the viewer to at least partially decompress it. In a stack with N spatially addressable, light attenuating layers, any light field sent to the display is reduced to N images—one for each of the layers. As these images are presented at a high frame rate, the viewer's eyes integrates the images into a high-rank approximation of the desired light field, thereby at least partially decompressing the imagery The higher the rank approximation that is achieved, the less lossy the compression.

In exemplary implementations of this invention, directional backlighting (used with multiple, time-multiplexed light attenuating layers) achieves a wide field of view, while reducing the need for additional layers and frames, yielding a thin, power-efficient, high-resolution light field display well suited for mobile and home theater applications. For example, in a prototype, a low-resolution lenslet-based directional backlight is used with a high-resolution LCD. In this prototype, a target light field is decomposed into a low-rank tensor approximation, increasing brightness and allowing more views to be generated than available frames. The NTF optimization framework allows arbitrary combinations of directional backlights and multiple light-attenuating display layers.

In exemplary implementations of this invention, multiplicative light attenuation to allow synthesized 3D objects to extend outside the enclosure. Furthermore, tensor displays support specularities, occlusions, and global illumination effects, without requiring moving parts.

In exemplary implementations, tensor displays enable trade-offs between image fidelity, resolution, brightness, and display complexity. These tensor displays employ compressive display modes, wherein low-rank tensor approximation efficiently exploits correlations between neighboring views to synthesize an emitted light field with an apparent number of views exceeding the number of frames. In contrast, prior direct display modes assign a single view to each frame, limiting resolution and brightness.

Tensor displays can provide greater depths of field, wider fields of view, and thinner form factors, compared to prior automultiscopic displays.

FIG. 1 is a high-level flow chart for a tensor display. A controller employs a linear optimization algorithm 101 to determine time changing attenuation mask patterns 109 for respective layers in a stack of temporally multiplexed, light attenuating layers. The controller outputs control signals to cause the layers to display these masks. A directional or uniform backlight illuminates the masks 111. Light from the backlight is transmitted through the layers in the stack, and emerges from the tensor display as a light field that can be perceived as a 3D image by a human viewer, without the viewer wearing any special glasses or optical apparatus 113. The target light field may comprise either (i) captured multi-view or light field data 105 or (ii) synthetic multi-view or light field data 103. In the latter case, a 3D model 102 may be used when generating the synthetic data 103. The target light field (103 or 105) is an input to the optimization algorithm 101. The optimization algorithm 101 may employ simplifying assumptions, and may be customized for (or may take into account) hardware design specification 107.

Figure 2:
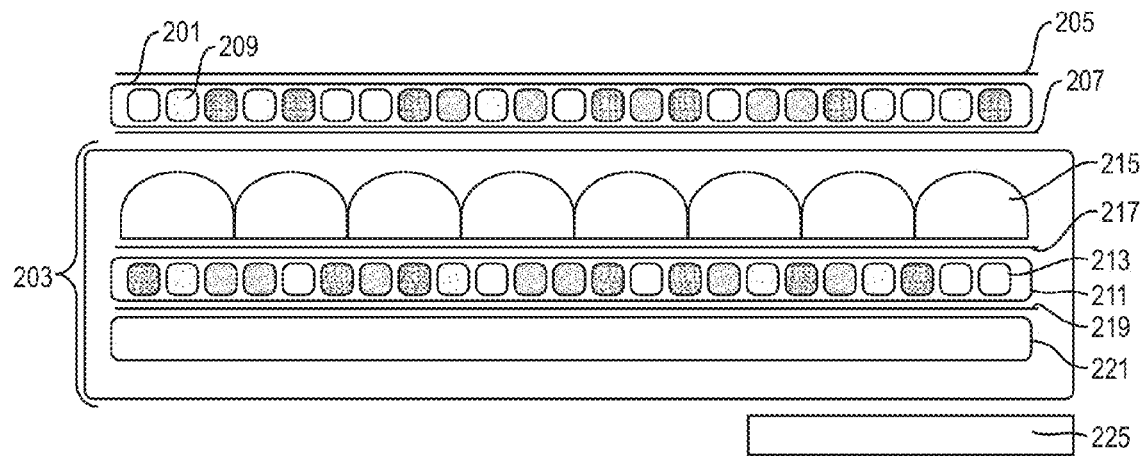
FIG. 2 is a diagram of a tensor display illuminated by a directional backlight.

FIG. 2 is a diagram of a cross-section of a tensor display illuminated by a directional backlight 203. The tensor display includes two LCD layers 201, 211. One of these LCD layers 201 is part of the directional backlight 203. The directional backlight 203 comprises: (i) a light source 221 (e.g. a CCFL array or LED array); (ii) polarization filters (e.g., polarizing films) 219, 217, (iii) a time-multiplexed LCD layer 213, and (iv) a sheet of lenslets 215. The directional backlight 203 illuminates a high resolution, time-multiplexed LCD layer 201. Polarization filters (e.g., polarizing filters) 205, 209 are positioned adjacent to LCD layer 201, one on each side of LCD layer 201. Polarization filters 205 and 207 are crossed (relative to each other), and polarization filters 217 and 219 are crossed (relative to each other). A controller 225 controls the masks displayed by LCD layers 201, 211. In addition, controller 225 controls the angle of light produced by respective pixels in the directional backlight 203. Alternately, directional backlight 203 may be a purely angular backlight.

Figure 3:
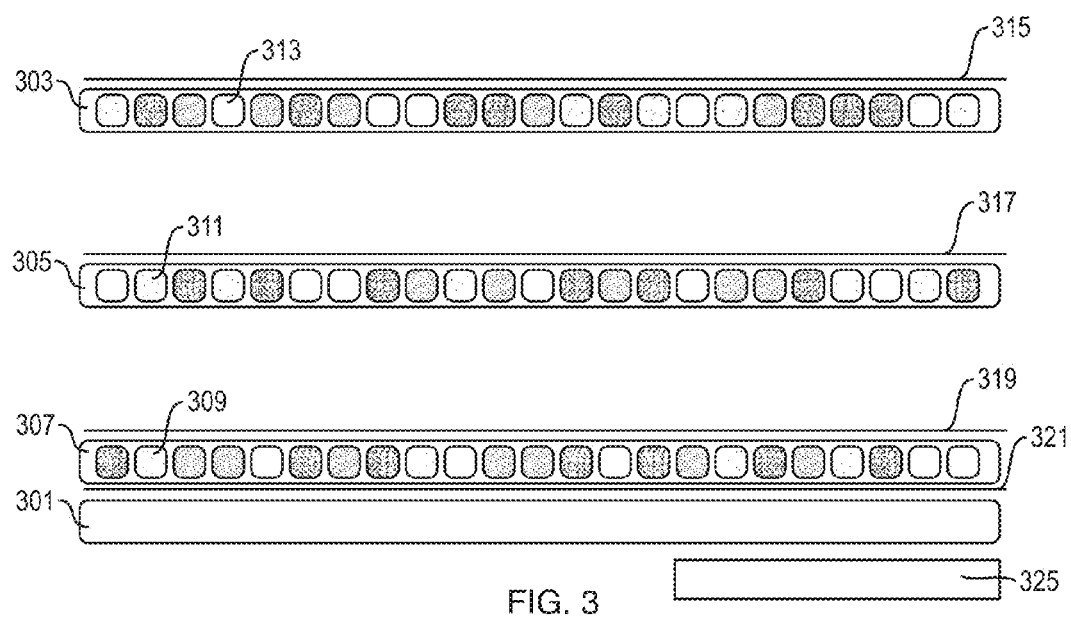
FIG. 3 is a diagram of three layer tensor display, illuminated by a uniform backlight.

FIG. 3 is a diagram of a cross section of a three layer tensor display, illuminated by a uniform backlight. In this example, none of the layers is part of the uniform backlight. As shown in FIG. 3, a uniform backlight 301 illuminates a stack of three LCDs 303, 305, 307. Polarization filters (e.g., polarization films) 315, 317, 319, 321 are arranged so that the polarization angles of adjacent filters are orthogonal to each other.

LCD layers 201, 211, 303, 305, 307 are configured to be able to temporally vary the light attenuation on a per pixel basis. For example, for each frame in a temporal sequence of frames, the controller (225 or 325) can control, for each respective each pixel (e.g., 209, 213, 309, 311, 313) in the LCD layers, whether light is more or less attenuated as it is transmitted through the pixel.

In the examples shown in FIGS. 2 and 3, the controller (e.g., 225, 325) comprises one or more processors. These processors perform computations, including rendering and numerical calculations of optimized approximations (e.g., using NT and multiplicative update). For example, the processors may compute time-multiplexed optimal masks, and may output command signals for the respective LCDs to display these masks. The processors are connected to the stack of LCDs by one or more connections, which connections may be wired or wireless. Depending on the particular implementation, the location of the one or more processors may vary. For example, the one or more processors may all be remote from the stack of LCDs. Or, for example, at least some of the one or more processors may be housed with, or adjacent to, the stack of LCDs.

Figure 4:
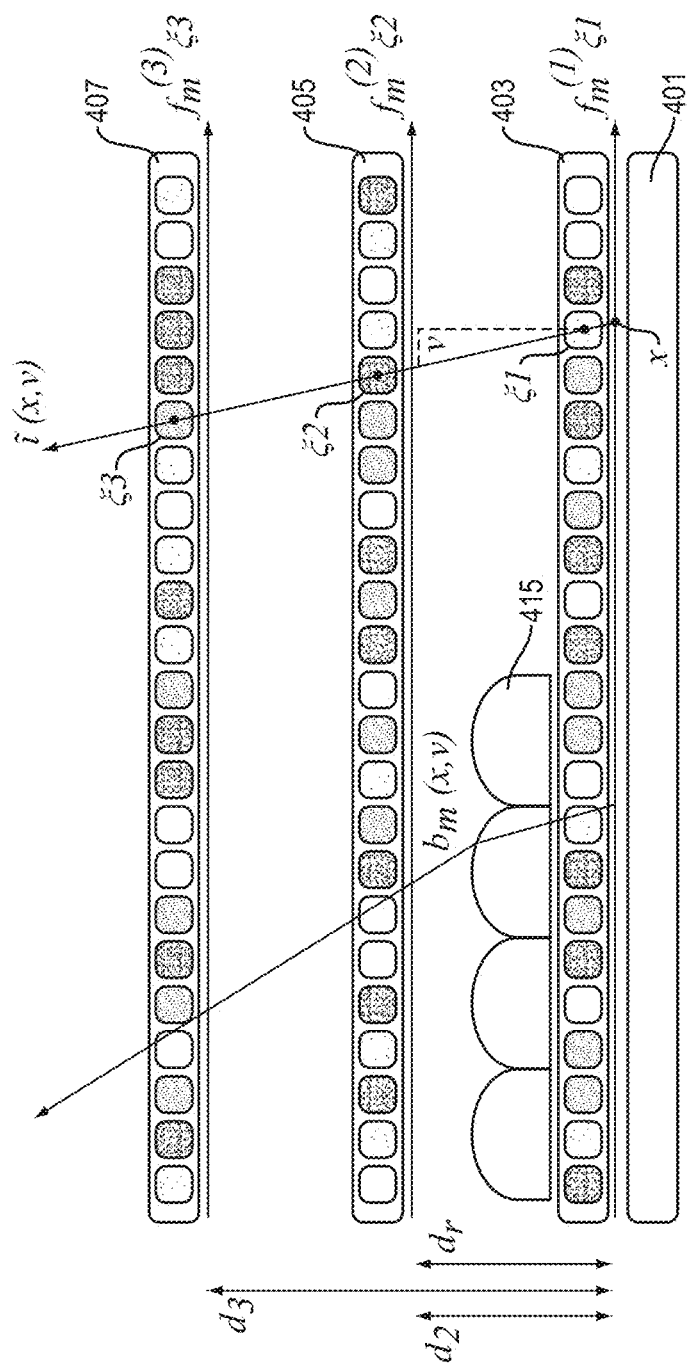
FIG. 4 shows tensor display coordinates.

FIG. 4 is a diagram that illustrates tensor display coordinates. Tensor displays comprise a stack of N light-attenuating layers illuminated by either a uniform backlight or a directional backlight. In the example shown in FIG. 4, there are three spatially addressable, light-attenuating layers 403, 405, 407. For full generality, assume that display layers support synchronized, high-speed temporal modulation, such that an observer perceives the time average of an M-frame multilayer mask sequence.

First, consider 2D light fields and 1D layers (an extension to 4D light fields and 2D layers is covered later). FIG. 4 shows a relative two-plane light field parameterization l(x,v), where v denotes the point of intersection of the ray (x, v) with a plane located a distance $d_r$ from the x-axis, expressed relative to x. The bottom left side of FIG. 4 represents one example of a directional backlight (implemented by covering a uniform backlight 401 with a lenslet array 415 and an LCD layer 403). The bottom right side of FIG. 4 represents a uniform backlight illuminating a stack of LCD layers 403, 405, 407.

Static Multilayer Displays: Consider a fixed stack of N light-attenuating layers (i.e., one that does not support temporal variation of the mask patterns). When illuminated by a uniform backlight with unit radiance, the emitted light field $\tilde{l}(x, v)$ is given by the following expression:

$$\tilde{l}(x, v; N) = \prod_{n=1}^{N} f^{(n)}(x + (d_n/d_r)v) \quad \text{(Eq. 1)}$$

where $f^{(n)}(\xi_n) \in [0,1]$ is the transmittance at the point $\xi_n$ of layer n, separated a distance $d_n$ from the x-axis.

Consider a three-layer configuration, with the transmittances for the rear, middle, and front layers given by $f(\xi_1)$, $g(\xi_2)$, and $h(\xi_3)$, respectively. Equation 1 gives the following expression for the emitted light field.

$$\tilde{l}(x,v) = f(\xi_1)g(\xi_2)h(\xi_3), \text{ for } \xi_n = x + (d_n/d_r)v \quad \text{(Eq. 2)}$$

The emitted light field $\tilde{l}(x,v)$ can be represented as the restriction of the function $$\tilde{t}(\xi_1, \xi_2, \xi_3) = f(\xi_1)g(\xi_2)h(\xi_3) \quad \text{(Eq. 3)}$$

defined in the three-dimensional Euclidean space $\mathbb{R}^3$ spanned by $\{\xi_1, \xi_2, \xi_3\}$, to the two-dimensional subspace defined by the equation $\alpha\xi_1 + \beta\xi_2 + \gamma\xi_3 = 0$, with $$\alpha = d_3 - d_2, \beta = d_1 - d_3, \gamma = d_2 - d_1 \quad \text{(Eq. 4)}$$

Thus, elements of the emitted light field $\tilde{l}(x,v)$ are restricted to the plane corresponding to Equation 4.

For the general case with N>3 layers, the emitted light field $\tilde{l}(x,v)$ can also be represented as the restriction of the function $$\tilde{t}(\xi_1, \xi_2, \ldots, \xi_N) = \prod_{n=1}^{N} f^{(n)}(\xi_n),$$

defined on $\mathbb{R}^N$, to a plane.

In practice, each layer has discrete pixels with constant transmittances rather than continuously-varying opacities. Thus, it is desirable to tabulate the transmittance $f_{i_n}^{(n)}$ at each pixel $i_n$ within the vector $\mathbf{f}^{(n)}$. As shown in FIG. 4, each light field ray (x,v) can be equivalently parameterized by the corresponding points of intersection $\{\xi_1, \xi_2, \ldots, \xi_N\}$ with each layer. For a three-layer display with discrete pixels, the intensity of the emitted light field $\tilde{t}\{\xi_1, \xi_2, \xi_3\}$ is approximated by the product $f_i g_j h_k$, where $\{i, j, k\}$ denote the pixel indices nearest to the points of intersection $\{\xi_1, \xi_2, \xi_3\}$. With this parameterization, Equation 3 can be represented in discrete coordinates as a $3^{rd}$-order, rank-1 tensor $\mathcal{T}$, given by $$\mathcal{T} = f \circ g \circ h, \text{ such that } \tilde{t}_{ijk} = f_i g_j h_k, \quad \text{(Eq. 5)}$$

where $\circ$ is the vector outer product.

Only a subset of tensor elements $\tilde{t}_{ijk}$ correspond to valid light field rays; most tensor elements correspond to "non-physical" rays (i.e., ones that spontaneously change position or direction after passing through a layer). To address this limitation of tensor representation, define a sparse, binary-valued weight tensor $\mathcal{W}$ such that the emitted light field tensor $\hat{\mathcal{L}}$ is given by the following expression:

$$\hat{\mathcal{L}} = \mathcal{W} \cdot \mathcal{T}, \qquad \text{(Eq. 6)}$$

$$\text{for } w_{ijk} = \begin{cases} 1 & \text{if } \{i, j, k\} \text{ gives a light field ray} \\ 0 & \text{otherwise} \end{cases}$$

where ● is the Hadamard (elementwise) product.

Non-zero elements of $\hat{\mathcal{L}}$ are close to the plane defined by Equation 4. Tensors provide sparse, memory-efficient representations for static N-layer displays; only the non-zero elements of $\hat{\mathcal{L}}$ are stored.

Figure 5:
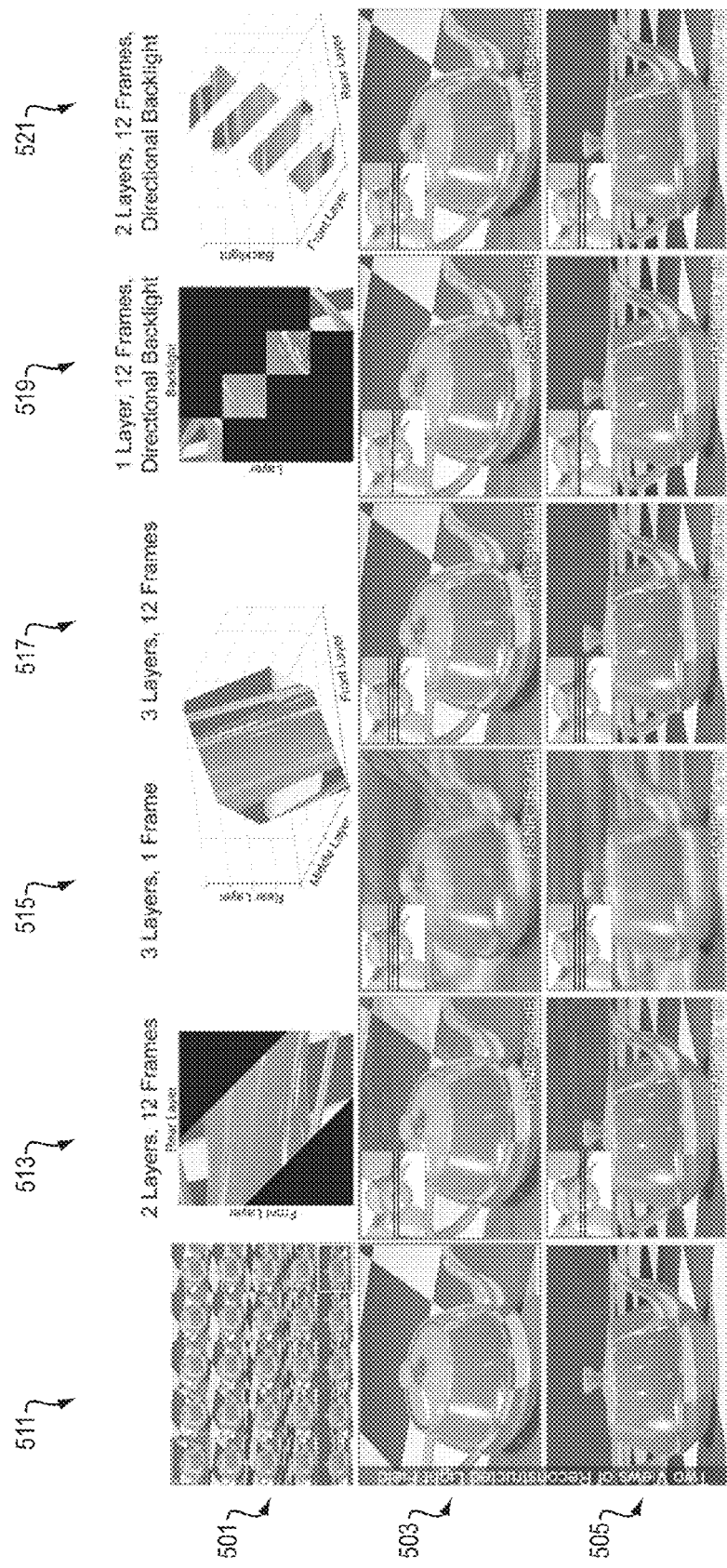
FIG. 5 is an overview of tensor displays. The overview shows (i) an original (input) light field for a scene, (ii) visualizations of the light field, for different tensor display architectures, and (iii) reconstructed views of the scene produced by different tensor display architectures.

FIG. 5 is an overview of tensor displays. In FIG. 5: (Top left, i.e., row 501 in column 511) A target light field for a teapot, rendered as 5×5 views with a 20 degree field of view, is shown in the top left. (Second and Third Rows) Each column of the second and third rows shows two examples of tensor display reconstructions of the scene, in a different implementation of this invention. Specifically, the second and third rows 503, 505 show two reconstructions of: (i) a two-layer, 12-frame display (column 513), (ii) a static three-layer display (column 515), (iii) a three-layer, 12-frame tensor display (column 517), (iv) a single-layer display using 12 frames and a directional backlight (column 519), and (v) a two-layer display using 12 frames and a directional backlight (column 521). In columns 519, 521, the spatial backlight resolution is a quarter that of each layer. The reconstructions in FIG. 5 show that time-multiplexing, as allowed by tensor displays, significantly reduces artifacts observed with the static three-layer configuration. The top row 501 (except for the left column 511) shows visualizations of the light field, as restricted to the plane within the display tensor $\mathcal{T}$ given by Equation 4. Specifically, these visualizations in the top row 501 are shown for five examples in columns 511, 513, 515, 517, 519, 521, discussed above.

Time-Multiplexed Multilayer Displays: static multilayer displays have finite degrees of freedom. Artifacts, resulting from limited depths of field and fields of view, persist in the emitted light field. These artifacts are typically observed as blur. These artifacts may be mitigated by increasing the degrees of freedom.

Increased degrees of freedom may be achieved by rapid temporal modulation, such that the observer perceives the average of an M-frame sequence. Generalizing Equation 1, the emitted light field $\tilde{l}(x,v)$ is given by $$\tilde{l}(x, v; N, M) = \frac{1}{M} \sum_{m=1}^{M} \prod_{n=1}^{N} f_m^{(n)}(x + (d_n/d_r)v) \qquad \text{(Eq. 7)}$$

where $f_m^{(n)}(\xi_n)$ is the transmittance at the point $\xi_n$ of layer n during frame m.

Let columns of the matrix $F^{(n)} = [f_1^{(n)} f_2^{(n)} \ldots f_M^{(n)}]$ define the sequence of M masks displayed on layer n. For a three-layer display, Equation 7 can be represented in discrete coordinates as a $3^{rd}$-order, rank-M tensor $\mathcal{T}$ given by $$\mathcal{T} = [\![F, G, H]\!] \equiv \frac{1}{M} \sum_{m=1}^{M} f_m \circ g_m \circ h_m \qquad \text{(Eq. 8)}$$

where matrices enclosed by double square brackets correspond to the CP decomposition (canonical polyadic decomposition) of a tensor into a sum of rank-1 tensors.

The CP decomposition is equivalent to CANDECOMP (canonical decomposition) and PARAFAC (parallel factors), with elements of the tensor $\mathcal{T}$ given by $$\tilde{t}_{ijk} = \frac{1}{M} \sum_{m=1}^{M} f_{im} g_{jm} h_{km}.$$

For the general case with N light-attenuating layers and M time-multiplexed frames, the emitted light field can be represented as an $N^{th}$-order, rank-M tensor $\mathcal{T} = [\![F^{(1)}, F^{(2)}, \ldots, F^{(N)}]\!]$.

Light field synthesis with time-multiplexed, multilayer displays requires decomposing a target light field l(x, v) into an M-frame sequence of N transmittance functions $f_m^{(n)}(\xi_n)$. This can be formulated as the following constrained nonlinear least squares problem:

$$\underset{\{f_m^{(n)}(\xi_n)\}}{\arg\min} \int_V \int_X (l(x,v) - \tilde{l}(x,v))^2 \, dx \, dv, \qquad \text{(Eq. 9)}$$

$$\text{for } 0 \leq f_m^{(n)}(\xi_n) \leq 1$$

where $\tilde{l}(x,v)$ is the emitted light field, given by Equation 7, and X and V denote the intervals $[x_{min}, x_{max}]$ and $[v_{min}, v_{max}]$.

The tensor representation discussed above provides an efficient means for solving Equation 9. Using this representation for a three-layer configuration with discrete coordinates, the objective function is expressed as $$\underset{\{F,G,H\}}{\arg\min} \|\mathcal{L} - \mathcal{W} \cdot [\![F, G, H]\!]\|^2, \qquad \text{(Eq. 10)}$$

$$\text{for } 0 \leq F, G, H \leq 1$$

where $\mathcal{L}$ is the target light field tensor, obtained by assigning the target light field l(x, v) to the plane defined by Equation 4, and $$\|\mathcal{X}\|^2 = \sum_{i=1}^{I} \sum_{j=1}^{J} \sum_{k=1}^{K} x_{ijk}^2$$

is the squared tensor norm of $\mathcal{X}$.

This expression can be solved by applying weighted non-negative tensor factorization (NTF) and multiplicative update rules. For a three-layer display, these update rules have the following forms:

$$F \leftarrow F \bullet ((W_{(1)} \bullet L_{(1)})(H \odot G)) \diamond ((W_{(1)} \bullet (F(H \odot G)^T))(H \odot G)) \qquad \text{(Eq. 11)}$$

$$G \leftarrow G \bullet ((W_{(2)} \bullet L_{(2)})(H \odot F)) \diamond ((W_{(2)} \bullet (G(H \odot F)^T))(H \odot F)) \qquad \text{(Eq. 12)}$$

$$H \leftarrow H \bullet ((W_{(3)} \bullet L_{(3)})(G \odot F)) \diamond ((W_{(3)} \bullet (H(G \odot F)^T))(G \odot F)) \qquad \text{(Eq. 13)}$$

In these expressions, $\diamond$ is Hadamard (elementwise) division. Also, in these expressions $\odot$ is the Khatri-Rao product, defined for a pair of matrices $A \in \mathbb{R}^{I \times K}$ and $B \in \mathbb{R}^{J \times K}$, such that $$A \odot B = [a_1 \otimes b_1 \, a_2 \otimes b_2 \ldots a_K \otimes b_K], \qquad \text{(Eq. 14)}$$

where $\hat{x}$ is the Kronecker product and $a_i$ and $b_j$ denote the $i^{th}$ and $j^{th}$ columns of A and B, respectively.

These update equations also make use of the tensor matricization (unfolding) operation, defined such that $x_{(n)}$ arranges the mode-n fibers of X to be columns of the resulting matrix.

For the general case with N light-attenuating layers and M frames, Equation 10 has the following form:

$$\arg\min_{\{F^{(n)}\}} \|\mathcal{L} - \mathcal{W} \cdot \tilde{\mathcal{F}}\|^2, \quad \text{(Eq. 15)}$$
$$\text{for } 0 \leq F^{(n)} \leq 1$$

where $\tilde{\mathcal{F}} = [[F^{(1)}, F^{(2)}, \ldots, F^{(N)}]]$.

Similarly, the update rules are generalized such that $$F^{(n)} \leftarrow F^{(n)} \bullet ((W_{(n)} \bullet L_{(n)} F_\odot{}^n) \diamond (W_{(n)} \bullet (F^{(n)}(F_\odot{}^{(n)})^T)) F_\odot{}^n) \quad \text{(Eq. 16)}$$

where $F_\odot{}^n$ is defined by the following expression:

$$F_\odot{}^n = F^{(N)} \odot \ldots \odot F^{(n+1)} \odot F^{(n-1)} \odot \ldots \odot F^{(1)} \quad \text{(Eq. 17)}$$

4D light fields and 2D layers require vectorizing the 2D layer transmittances, giving a similar set of transmittance vectors $f_m^{(n)}$. Values are clamped to the feasible range after each iteration of Equation 16.

According to principles of this invention, tensor representation allows for the decomposition of a target light field into a set of time-multiplexed, light-attenuating layers. The multiplicative update rules allow an efficient, GPU-based implementation that achieves interactive refresh rates with multilayer LCDs.

As shown in the fourth column (517) of FIG. 5, time multiplexing significantly reduces artifacts observed with multilayer displays, as quantified by the peak signal-to-noise ratio (PSNR). Yet, such displays are still restricted to relatively narrow fields of view (i.e., ≲20°). One way to expand the field of view would be to further increase the refresh rate. However, this solution may be precluded by the underlying display hardware.

In exemplary implementations of this invention, an alternate approach for achieving wider fields of view is used: replacing conventional uniform backlighting with time-multiplexed directional backlighting.

A directional backlight is equivalent to a low-resolution light field display. Consider a directional backlight that has significantly lower spatial resolution, but equivalent angular resolution and field of view, as compared to the target light field $l(x,v)$. In that case, it is desirable to enhance the spatial resolution by covering a low-resolution light field display with an N-layer stack of light-attenuating layers. Generalizing Equation 7, the light field emitted by such a display architecture is given by the following expression:

$$\tilde{l}(x, v) = \frac{1}{M} \sum_{m=1}^{M} b_m(x, v) \prod_{n=1}^{N} f_m^{(n)}(x + (d_n/d_r)v) \quad \text{(Eq. 18)}$$

where $b_m(x, v)$ denotes the light field emitted by the backlight during frame m.

Let B denote the discrete backlight light field, such that $b_{as}$ corresponds to pixel s of view a. The backlight light field can be equivalently represented as a vector b, defined as follows.

$$b = [b_1^T b_2^T \ldots b_S^T]^T, \text{ for } b_s = [b_{1s} b_{2s} \ldots b_{As}]^T \quad \text{(Eq. 19)}$$

Using this parameterization, Equation 18 can be represented in discrete coordinates as an N+1-order, rank-M tensor $\tilde{\mathcal{F}}$, given by $$\tilde{\mathcal{F}} = \frac{1}{M} b_m \circ f_m^{(1)} \circ f_m^{(2)} \circ \ldots \circ f_m^{(N)} \quad \text{(Eq. 20)}$$

where tensor element $$\tilde{t}_{ij_1 j_2 \ldots j_N} = \frac{1}{M} \sum_{m=1}^{M} b_{im} \prod_{n=1}^{N} f_{j_n m}^{(n)}.$$

Since Equations 8 and 20 are similar, NTF can also be applied to optimize multilayer displays with directional backlighting.

As shown in FIG. 5, directional backlighting allows multilayer displays to achieve wide fields of view, even with a single high-speed, light-attenuating layer. Tensor representation for multilayer displays provides a computationally-efficient optimization scheme encompassing a wide variety of display architectures.

Tensor displays can exploit the additional degrees of freedom arising from multiple layers and frames to achieve high-fidelity light field reconstructions.

Figure 6:
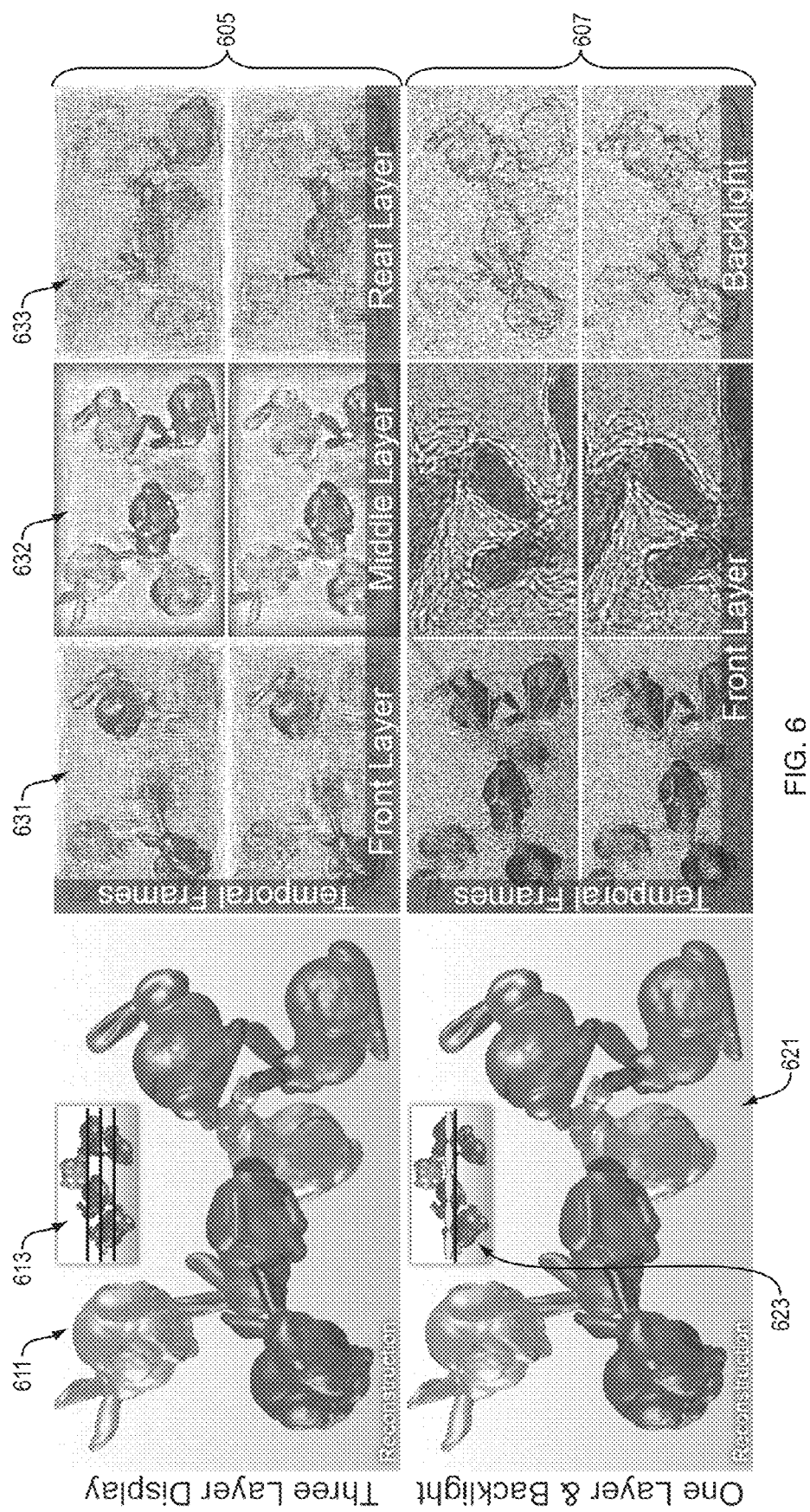
FIG. 6 shows reconstructed views of a scene produced by tensor displays (left), and tensor display decompositions of the scene (right).

The upper portion 605 of FIG. 6 shows reconstruction and decomposition results for a tensor display that comprises three LCD layers and a uniform backlight: The upper right side (columns 631 top, 632 top, 633 top) show deconstruction results, the top left side 611 shows reconstruction results.

Objects close to the display appear sectioned across layers. For example, an object close to the display may map primarily to the front layer, with residual details assigned to other layers. Similar sectioning behaviors have been observed in the past with multilayer-only decompositions. Unlike these works, however, joint multilayer, multiframe decompositions produce additional time-varying, high-frequency patterns that appear across all layers and resemble content-adaptive parallax barriers.

The bottom portion 607 of FIG. 6 shows reconstruction and decomposition results for a tensor display that comprises a front LCD layer and a directional backlight. The bottom right side (columns 631, 632, 633) shows deconstruction results, the bottom left side 621 shows reconstruction results. The front LCD layer (shown in the bottom portion 605 of columns 631, 632) displays view-independent portions of the scene, with flowing, slit-like patterns appearing around regions with view-dependent features. The directional backlight layer (shown in the bottom portion 605 of column 633) displays primarily view-dependent features, such as objects extending from the physical display enclosure.

In FIG. 6, views 613, 623 show the position of the bunnies in the scene, viewed from the top.

Tensor display decompositions exhibit predictable structures, whose arrangement arise from the specific display configuration. Heuristically-defined methods can achieve similar fidelity with reduced computation.

The performance of an automultiscopic display can be quantified by its depth of field: an expression for the maximum spatial frequency $\omega_{\xi_{max}}$ that can be depicted in a plane oriented parallel to the screen and separated by a distance $d_o$. This expression is derived using a frequency-domain analysis of the emitted light field $\tilde{l}(x,v)$.

Taking the 2D Fourier transform of Equation 18 yields the following expression for the emitted light field spectrum $\hat{l}(\omega_x, \omega_y)$:

$$\hat{l}(\omega_x, \omega_y) = \frac{1}{M}\sum_{m=1}^{M} \hat{b}_m(\omega_x, \omega_y) * \left[ \underset{n=1}{\overset{N}{*}} \hat{f}_m^{(n)}(\omega_x)\delta(\omega_v - (d_n/d_r)\omega_x) \right] \quad \text{(Eq. 21)}$$

where $\omega_x$ and $\omega_v$ are the spatial and angular frequencies, * denotes convolution, and the repeated convolution operator is defined as $$\underset{n=1}{\overset{N}{*}} \hat{f}_m^{(n)} \equiv \hat{f}_m^{(1)}(\omega_x, \omega_v) * \ldots * \hat{f}_m^{(N)}(\omega_x, \omega_v) \quad \text{(Eq. 22)}$$

For uniform backlighting, the backlight spectrum $\hat{b}_m(\omega_x, \omega_v) = \delta(\omega_x, \omega_v)$, the Dirac delta function.

The spectral support of a tensor display is the region of non-zero values in the emitted light field spectrum, for all possible layer masks and backlight illumination patterns. The spectral support for the light field reflected by a diffuse surface is the line $\omega_v = (d_o/d_r)\omega_x$.

Intersecting this line with the spectral support for a given display provides a geometric construction for the upper bound on the depth of field. For example, the emitted light field spectrum for a parallax barrier or integral imaging display is non-zero only for $|\omega_x| \leq 1/(2\Delta x)$ and $|\omega_v| \leq 1/(2\Delta v)$, where $\Delta x$ and $\Delta v$ are the spatial and angular sampling rates, respectively. In practice, the spatial sampling rate $\Delta x$ is the spacing between barrier slits/pinholes or lenslets.

The geometric construction yields the following expression for the depth of field:

$$\omega_{\xi_{max}}(d_o) = \begin{cases} \frac{1}{2\Delta x} & \text{for } |d_o| \leq d_r\left(\frac{\Delta x}{\Delta v}\right), \\ \frac{d_r}{2|d_o|\Delta v} & \text{otherwise,} \end{cases} \quad \text{(Eq. 23)}$$

where $\Delta v = (2d_r/A)\tan(\alpha/2)$ with A views and field of view $\alpha$.

The geometric construction provides an upper bound on the depth of field for any tensor display architecture. Consider a two-layer display with uniform backlighting, with the layers separated by a distance $\Delta d$ and $\omega_0 = 1/(2p)$ denoting the maximum spatial frequency for each layer with pixel pitch p. Equation 21 defines the light field spectrum, where $d_1 = -\Delta d/2$ and $d_2 = \Delta d/2$. A diamond-shaped region bounds the spectral support for any two-layer display. The spatial cutoff frequency $\omega_{\xi_{max}}$ is again found by intersecting the line $\omega_v = (d_o/d_r)\omega_x$ with the boundary of the spectral support, yielding the following upper bound on the depth of field for any two-layer display.

$$\omega_{\xi_{max}}(d_o) = \left(\frac{2\Delta d}{\Delta d + 2|d_0|}\right)\omega_0 \quad \text{(Eq. 24)}$$

Using the previously described geometric construction, the depth of field for a three-layer display with uniform backlighting and equally-spaced layers is given by $$\omega_{\xi_{max}}(d_o) = \begin{cases} \left(\frac{3\Delta d}{\Delta d + |d_0|}\right)\omega_0 & \text{for } |d_o| \leq 2\Delta d, \\ \left(\frac{2\Delta d}{|d_0|}\right)\omega_0 & \text{otherwise,} \end{cases} \quad \text{(Eq. 25)}$$

where Equation 21 is again applied to find the spectral support, with $d_1 = -\Delta d$, $d_2 = 0$, and $d_3 = \Delta d$.

The spectral support for a three-layer display exceeds that of a similar parallax barrier or integral imaging display, leading to increased depth of field.

Incorporating directional backlighting can significantly expand the field of view. The depth of field for a single-layer display using directional backlighting is obtained by a similar geometric construction.

Consider a directional backlight which implements a low-resolution light field display, such that $\hat{b}_m(\omega_x, \omega_v)$ has non-zero support for $|\omega_x| \leq 1/(2\Delta x)$ and $|\omega_v| \leq 1/(2\Delta v)$. This yields the following depth of field expression:

$$\omega_{\xi_{max}}(d_o) = \begin{cases} \frac{1}{2\Delta x} + \omega_0 & \text{for } |d_o| \leq d_r\left(\frac{\Delta x}{\Delta v + 2\Delta x\Delta v\omega_0}\right) \\ \frac{d_r}{2|d_o|\Delta v} & \text{otherwise,} \end{cases} \quad \text{(Eq. 26)}$$

where $\omega_0$ again denotes the spatial cutoff frequency for the layer.

The addition of a single light-attenuating layer significantly increases the spatial resolution for a conventional parallax barrier or integral imaging display, particularly near the display surface. However, far from the display, the depth of field is identical to these conventional automultiscopic displays.

Advantageously, tensor displays can achieve increased depth of field by covering any low-resolution light field display with time-multiplexed, light-attenuating layers. In a prototype of this invention, the optimization program uses continuously-varying layer transmittances. Alternately, the upper bound of the depth of field can be characterized with discrete pixels.

In some implementations of this invention: (a) static and time-multiplexed tensor displays have identical spectral supports (i.e., averaging over an M-frame sequence does not alter the support via Equation 21); yet (b) time multiplexing significantly reduces artifacts. Without being limited by theory, the reduced artifacts may be attributable, at least in part, to additional degrees of freedom allowed with time multiplexing. While the upper bound of the depth of field may be identical, in practice it cannot be achieved with static methods, motivating tensor displays for joint multilayer, multiframe decompositions capable of approaching the upper bound.

An important benefit of tensor displays is to open a design trade space not accessible to conventional automultiscopic displays. Conventional multilayer-only or multiframe-only decompositions require many layers or prohibitively high frame rates, limiting their practicality using current LCD technology. However, with joint multilayer, multiframe decompositions, display designers can explore the interdependence of the number of layers, the number of frames, and the image brightness.

In exemplary implementations, tensor displays use fewer layers and frames achieve higher-fidelity reconstructions than conventional methods, in a manner supported by current LCD technology. Tensor displays can achieve wide fields of view, as required for multiviewer scenarios.

Consider a fixed set of uniformly-spaced viewpoints during optimization. Providing closely-spaced target views sufficiently constrains the decompositions so minimal artifacts are perceived at intermediate viewpoints.

In some implementations, it is desirable to maximize image fidelity (e.g., PSNR) as a function of device complexity (i.e., the number of layers and frames). Increasing the number of frames allows the number of layers to be decreased (for a given PSNR). Image fidelity also depends on the brightness scale β∈[0,1] applied to the target light field. Modifying Equation 15 yields the following objective function supporting a trade-off between image brightness and fidelity.

$$\underset{\{F^{(n)}\}}{\arg\min} \|\beta \mathcal{L} - \mathcal{W} \cdot \vec{\mathcal{F}}\|^2, \quad \text{(Eq. 27)}$$

$$\text{for } 0 \leq F^{(n)} \leq 1$$

Decreasing brightness generally yields higher-fidelity reconstructions for the same number of layers and frames.

For example, consider the trade space for multilayer displays with brightness β=0.2 m, in a prototype of this invention. In this example: (a) static decompositions (i.e., M=1) cannot exceed 30 dB, even with as many as eight layers; (b) to achieve 40 dB with eight layers, two frames are required; (c) there is a trade-off between layer complexity and refresh rate along the 40 dB curve; and (d) using six frames, only three layers are required, with more frames providing marginal benefits. Thus, with tensor displays, high-speed displays may be used to reduce device complexity, minimizing the number of layers to achieve a certain image fidelity.

Adding a directional backlight alters the design trade space. For example, consider a prototype of this invention, in which a directional backlight has 47×29 lenslets. In this directional backlight example: (a) two frames are still required to reach 40 dB using eight layers; but (b) only a single layer is required using eight frames. In this example, the directional backlight effectively reduces the number of required layers by one. This underscores the practical benefits of the tensor display framework, which can employ multilayer decompositions, time-multiplexing, and directional backlighting together.

In other applications of a prototype of this invention: (i) for three layers and a uniform backlight, four frames are required to achieve 40 dB, and with additional frames, brightness can be significantly increased (up to β≈0.6); and (ii) for single layer and a directional backlight, a minimum of eight frames are required to achieve 40 dB. (If the directional backlight itself includes an LCD layer, then a single LCD layer and directional backlight actually comprise two LCD layers).

Conventional automultiscopic displays, including parallax barriers and integral imaging, exhibit a set of periodically-repeating viewing zones. In contrast, recent (prior art) computationally-optimized multilayer and multiframe displays generally (i) exhibit a set of non-repeating viewing zones, and (ii) yield extended depths of field, greater resolution, and increased brightness. However, these (prior art) computationally-optimized multilayer and multiframe displays typically have, for any single viewer, a limited field of view per of α≲20°.

Tensor displays can support wider fields of view, while retaining the benefits of computational optimization. In a prototype of this invention, a field of view of α=50°×20° is achieved, for a light field with 9×3 views, using either five layers and uniform backlighting or a single layer and directional backlighting. Prior art multilayer-only and multiframe-only decompositions lack sufficient degrees of freedom to achieve high-PSNR reconstructions for these scenarios.

A prototype of this invention comprises a reconfigurable tensor display capable of implementing two-layer and three-layer architectures with uniform or directional backlighting. The layers are constructed using three modified Viewsonic® VX2268wm 120 Hz LCD panels. The front and rear polarizing films are removed from the front two LCDs, and the stack is interleaved with alternating crossed linear polarizers. Aluminum brackets added to the rear panel allow lenslet arrays to be affixed for operation as a directional backlight. A rectangular lenslet array is approximated using two crossed lenticular sheets, purchased from Micro Lens Technology, Inc. The corrugated surfaces of the sheets are held in direct contact, minimizing astigmatic aberrations. The directional backlight supports varying spatio-angular resolution trade-offs using 10, 15, and 20 lenses per inch (LPI) lenticular sheets. In directional backlighting modes, an additional polarizing film is placed after the lenslet arrays, restoring the linear polarization state before rays impinge on the next LCD in the stack.

This prototype employs offline and online solvers based on Equation 16. Computation is divided between CPUs (central processing units) for the offline solver, and GPUs (graphical processing units) for the online solver. The offline solver is run on an Intel Core® i5 workstation with 10 GB of RAM. The online solver is run on an Intel Core i7 workstation with 6 GB of RAM and an external Nvidia® QuadroPlex 7000 graphics unit containing two Quadro® GPUs and a G-Sync card. This provides four frame-synchronous DVI (Digital Visual Interface) outputs capable of driving the LCDs at 120 Hz.

In this prototype, target light fields are rendered using POV-Ray (Persistence of Vision Raytracer program) or, for interactive applications, using OpenGL (Open Graphics Language). Rendered light fields have a spatial resolution of 840×525 pixels (i.e., half the resolution of LCDs used in this prototype) and an angular resolution of 5×5 views.

This prototype employs nonnegative tensor factorization (NTF) using the multiplicative update rules described above. An offline, Matlab®-based solver is used for simulations. Decomposing a target light field into a six-frame sequence for three layers takes approximately 30 minutes using 50 updates. Color channels are processed independently. An online, GPU-accelerated solver is implemented in OpenGL and Cg (C for Graphics). In some applications, the update rules are cast as additive combinations of the logarithms of the layer transmittances. Using this representation, the update rules are mapped to standard operations of the graphics pipeline, including projective texture mapping, accumulation buffers, floating point framebuffers, and perspective rendering. These operations are not only computationally efficient, but also memory-efficient, as only the non-zero tensor elements need to be stored and processed. For interactive applications, temporal coherence between decompositions may be exploited, seeding each frame with the prior result. Portions of the pseudocode used for the GPU-accelerated solver is set forth in the Pseudocode section below.

In this prototype, separate threads are used to decouple the decomposition from the display routines. Decompositions are evaluated in an asynchronous thread, updating layer patterns as they become available. This ensures that all display layers can be continuously refreshed at 120 Hz, without waiting for updated decompositions. This prototype can achieve up to 10 multiplicative updates per second for as many as 12 frames. Light fields with reduced spatial or angular resolution can be decomposed and displayed at interactive refresh rates, as shown in the supplementary video.

In this prototype, the multiplicative updates constitute an alternating least squares solution to the nonlinear tensor factorization problem, employing steepest descent with a fixed step length. While this approach typically exhibits slow convergence using a CPU-based implementation, each update is efficiently computed using the GPU-accelerated implementation. To support interactive applications, temporal coherence between decompositions can be exploited, seeding each frame with the prior decomposition. For static scenes, seeding results in one update per frame. For interactive applications, seeding introduces motion blur. Given sufficient computational resources, blur can be eliminated by using multiple updates per frame.

This prototype is reconfigurable, as noted above. In one configuration, this prototype comprises a three-layer LCD with uniform backlighting.

In this three-layer, uniform backlighting configuration: Acrylic spacers separated each panel by $\Delta d=4.0$ cm. The target light field was rendered with a field of view of $\alpha=20°\times 20°$ and brightness $\beta=0.2$ (see Section 4.2

Experiments with the prototype provide insights into practical engineering issues. Accurate mechanical alignment is desirable. Decomposed layers exhibit high-frequency patterns; it is desirable that these patterns be properly aligned. Accurate alignment is ensured by displaying perspective images of a crosshair array on each layer. A camera is placed at the desired viewer position (e.g., directly in front of the display at a distance of 2 m) and the patterns were shifted until alignment was obtained. Radiometric calibration is desirable, including measuring the black levels and gamma values. The former are incorporated as constraints in the update rules, while the latter are addressed by applying gamma correction at runtime. Without being limited by theory, remaining variations in color and intensity may be attributable to differences in the LCD color gamut, color filter cross-talk, moire due to stacking multiple layers, and angular color variation common to high-speed LCDs.

Figure 7:
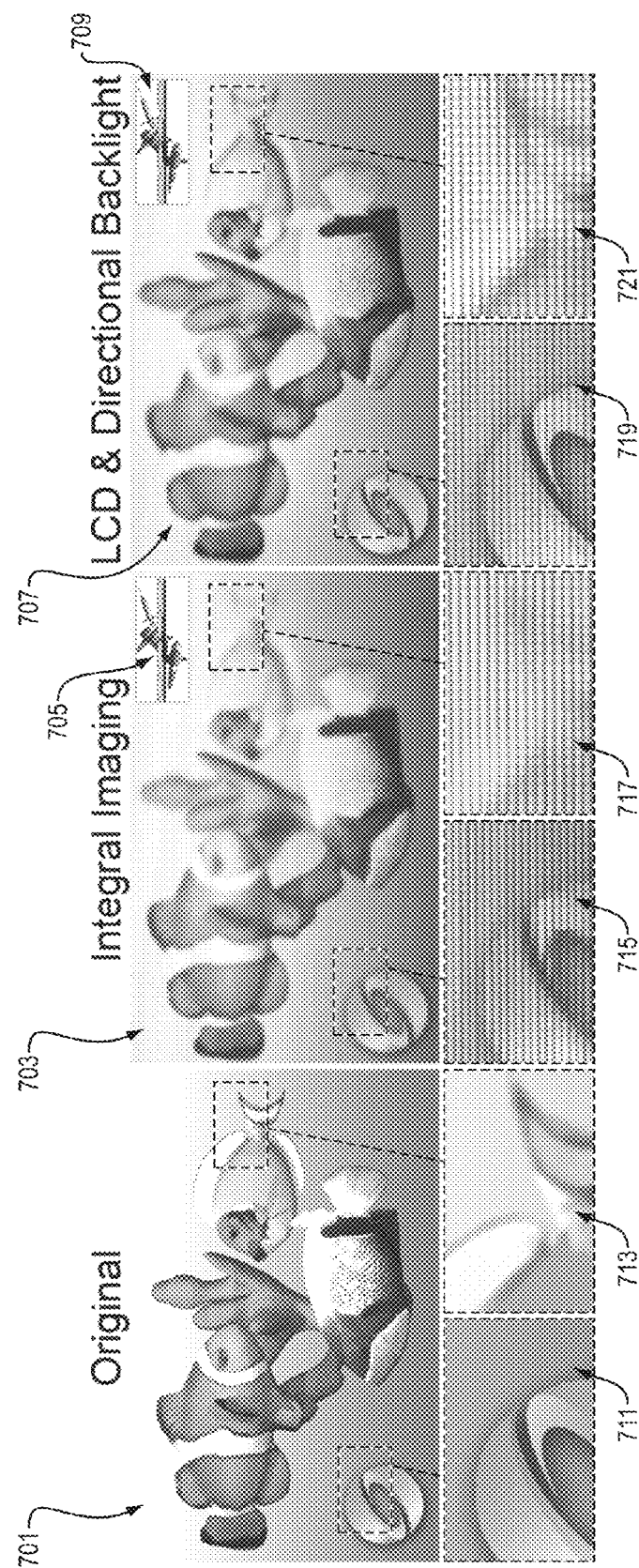
FIG. 7 shows an original light field for a scene (left), images of the scene produced by integral imaging (middle), and images of the scene produced by a tensor display (right).

In a second configuration, this prototype comprises a single LCD with a directional backlight. The backlight uses crossed 10 LPI lenticular sheets, yielding a field of view of $\alpha=48'\times 48'$ and backlight resolution of 187×117 lenslets. The front LCD is separated by $\Delta d=8.5$ mm from the middle of the lenticular sheets. Remaining system parameters are identical to the three-layer prototype. The crossed lenticular sheets produce strong absorption along lens boundaries. In a commercial implementation, lenslet arrays can be manufactured with minimal absorption. Alternatively, edge-lit directional backlighting can eliminate this artifact. As shown in FIG. 7, adding an LCD in front of a low-resolution directional backlight increases the spatial resolution for virtual objects appearing on the display surface (e.g., the logo 719) and for objects extending in depth (e.g., the fish tail on the right 721). Resolution can be enhanced at the display surface without time multiplexing. However, time multiplexing allows resolution enhancement for extended scenes. Such time multiplexing is facilitated by a tensor framework.

FIG. 7 shows an original light field for a scene (701, 711, 713), images of the scene produced by integral imaging (703, 715, 717), and images of the scene produced by a tensor display (707, 719, 721). While integral imaging, implemented in this example with a lenslet array affixed to an LCD, achieves a convincing 3D effect, spatial resolution is significantly reduced (703, 715, 721). Adding an LCD in front of the low-resolution backlight and exploiting temporal multiplexing using a tensor framework increases the spatial resolution, not only on the physical layers, but also outside the hardware enclosure (707 719, 721). Views 705, 709 show the position of the fish in the scene, viewed from the top.

Tensor displays open a large design trade space that was inaccessible using prior automultiscopic displays. With a tensor display framework, designers can maximize image fidelity, brightness, and field of view, depending on the number of layers and maximum refresh rate allowed by the design constraints and display technology, respectively.

In some cases, this invention is implemented with a single LCD with a directional backlight. This design has many advantages. Such displays support a wide field of view with relatively few frames (i.e., as few as three). Thus, provided with 180 Hz LCDs, this design can achieve a thin form factor, wide field of view, bright automultiscopic display with an effective refresh rate of 60 Hz.

In some cases, this invention employs joint multilayer, multiframe decompositions with uniform backlighting. These decompositions can be an effective tool for optimizing multilayer displays with uniform backlighting. Such displays with uniform backlighting can have the added benefit of a tunable field of view. This allows viewing zones to adapt to the location of viewers. (In contrast, in one of the prototypes of this invention, directional backlighting has a fixed field of view).

A prototype of this invention exhibits several limitations inherent to layered architectures, including moire, color-channel crosstalk, interreflections, misalignment, and dimming due to layered color filter arrays. Many of these issues can be resolved with additional optical engineering. Moire, interreflections, and misalignment can be mitigated using holographic diffusers, antireflective coatings, and rigid enclosures, respectively. A direct solution to crosstalk is to alter the transmission profiles of the color filters; however, this approach will further decrease brightness. Instead, field sequential color can be applied (i.e., using a backlight that sequentially strobes each color), albeit by placing additional demands on the refresh rate.

In some implementations of this invention, color filters are not used for each layer. In that case, decompositions are performed assuming monochromatic panels interspersed with a few color filters.

The weight tensor applied in Equation 16 allows decompositions to be tuned to the positions of viewers. Head or eye tracking may be employed, and the weight matrix can be altered to only project automultiscopic imagery aligned to each viewer. Between viewers, the emitted light field can be unconstrained, allowing for higher-fidelity, brighter imagery.

The image formation model, given by Equation 18, can be generalized. For example, the model can be generalized to apply to time-multiplexed, light-attenuating layers over a uniform light source, with one lenslet array between the first and second layers.

In some implementations of this invention, at least some of the layers comprise both light-attenuating and light-emitting materials. Optionally, refractive elements can be placed at any point (e.g., a Fresnel lens in front of the display to extend the depth of field).

In some implementations of this invention, additional views are used to create accommodation and convergence cues. To support more views, higher-speed displays can be employed. For example, tensor displays can be implemented with digital microshutters (DMS), capable of achieving 1,440 Hz refresh rates, allowing 24 frames with an effective refresh rate of 60 Hz.

In a prototype of this invention, least-squares optimization is employed. Alternately, perceptual error metrics may be used in tensor displays. Advantageously, perceptual error metrics allow further reductions in complexity (i.e., fewer layers and frames). In some cases, perceptual error metrics involve nonlinear objectives and use modified optimization schemes.

Tensor displays can bring together the advantages of multilayer panels, high refresh rates, and directional backlighting. In exemplary implementations of this invention, tensor displays comprise computational displays, wherein the display architecture and encoding algorithm are jointly optimized to maximize optical and computational efficiency.

This invention can be implemented as a single LCD with a directional backlight. This design achieves a wide field of view and large depth of field with a thin form factor using efficient multiplicative updates.

Tensor displays may be implemented in many different ways. Preferably, in tensor displays, multiple light-attenuating optical elements are combined in a way such that each ray in a target light field intersects each optical element at most once. Light-attenuating elements can be arranged in layers comprising any of the following: angularly-invariant spatial light modulators, purely directional modulators, and spatio-angular modulators. A low-resolution light field backlight, for instance, implemented by a lenslet array on top of an LCD, is one type of spatio-angular modulator.

In exemplary implementations of this invention, the tensor space spanned by a tensor display with N optical elements, such as layers, is of dimension N. The light field only occupies a low-dimensional manifold within the tensor space. The shape of the manifold depends on a particular tensor display configuration (e.g., a three-layer display or a dual-layer configuration with an additional directional backlight). A weighted nonnegative tensor decomposition has non-zero values only on the low-dimensional manifold created by the light field in tensor space.

Figure 8:
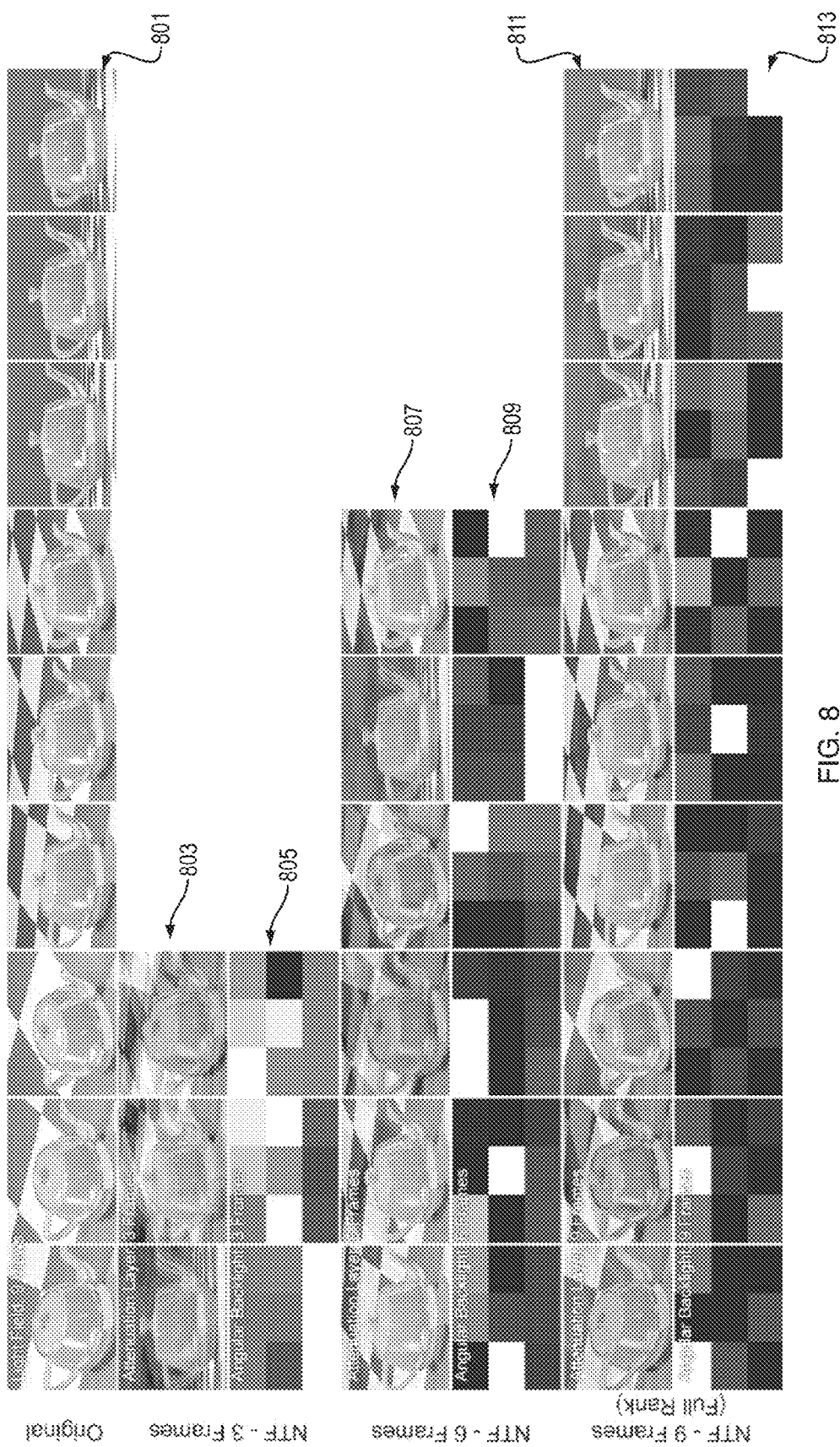
FIG. 8 shows an original light field of a scene (top row) and tensor display decompositions of the scene (other rows).

FIG. 8 illustrates an original light field with 3×3 views (row 801) and decompositions (rows 803, 805, 807, 809, 811, 813) for a high-resolution layer directly on top of a purely directional backlight. This kind of backlight corresponds to a single large lens directly behind an LCD with another spatial light modulator (SLM) mounted at the focal length of the lens; the secondary SLM has a resolution of 3×3, corresponding to the angular resolution of the light field. Decompositions for both high-resolution LCD and low resolution angular backlight are shown for three time-multiplexed frames (rows 803, 805), six frames (rows 807, 809), and nine frames (rows 811, 813). The brightness for all decompositions is scaled by the inverse of the number of frames. As seen in the lower two rows (rows 811, 813), NTF converges toward the obvious solution: turning on each direction of the backlight sequentially over time with the LCD showing the corresponding view of the light field. NTF, however, generalizes the factorization problem to an arbitrary number of frames and different brightness tradeoffs. For the case of rank-deficient decompositions (rows 803, 805, 807, 809), the views and corresponding backlight directions are automatically grouped into the set of structurally similar views that result in the optimal image quality.

In some implementations of this invention, a low-resolution directional backlight combined with a high-resolution layer, such as an LCD, can achieve high image quality by temporally multiplexing only a few frames.

Figure 9:
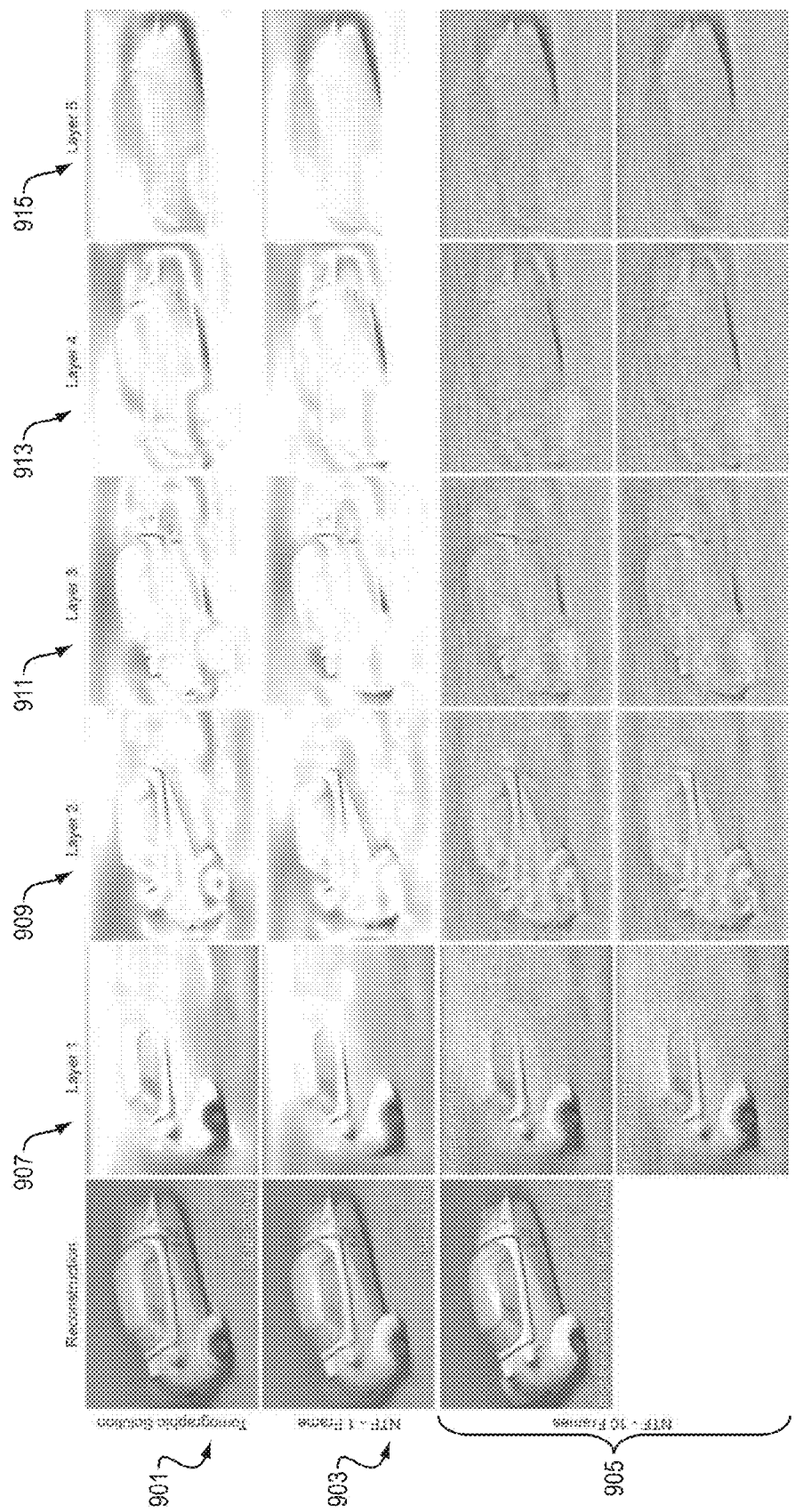
FIG. 9 shows NTF-based multilayer decompositions of a scene.

FIG. 9 shows NTF-based multilayer decompositions of a scene. In FIG. 9, the leftmost column comprises reconstructions of a scene using (i) a tomographic solution (901, left), (ii) NTF, with one frame (903, left), and (iii) NTF, with three frames (905, left). Columns 907, 909, 911, 913, 915 show decompositions for Layer 1, Layer 2, Layer 3, Layer 4, Layer 5.

As shown in FIG. 9: A tomographic five-layer decomposition (row 901) is intuitive, because it acts similar to a 3D geometry slicing operator for diffuse objects inside the physical display enclosure. For global illumination effects and objects outside the layers, however, the decompositions are more complicated. A nonnegative tensor factorization for the same optical configuration, without any time multiplexing, is shown in row 903. The decompositions show a close similarity to the tomographic solution. A difference between the two rows (901, 903) is that the tomographic solution is computed in log-space, resulting in a linear problem which can be solved efficiently, but with biased errors. As seen in column 907, specular highlights are slightly blurred and artifacts resulting from the parallax between different viewpoints are more pronounced. By adding temporal multiplexing, as shown in the lower two rows 905, the achieved quality can be significantly improved. The decompositions themselves still resemble a slicing operator in the lower frequencies, but what is perceived as temporally-varying high-frequency noise (lower two rows 905 in columns 909, 911, 913, 915) actually contains the information necessary to improve the resulting 3D image quality. Note that any multiframe decompositions computed with NTF represent a tradeoff between PSNR and brightness; the latter is enhanced for the simulated reconstruction in row 905 (left).

As shown in FIG. 9, the low spatial frequencies in NTF-decomposed layers are comparable to the tomographic solution. This acts similarly to a 3D geometry slicing operator for Lambertian objects on the layers. Multiframe decompositions computed with the tensor framework additionally contain high-frequency variations in image regions exhibiting motion parallax. Although these high-frequencies could be perceived as noise, they actually contain the information that increases the 3D image quality for temporally-multiplexed tensor displays. Multilayer decompositions computed with nonnegative tensor factorization are structurally similar to the tomographic case if no temporal multiplexing is used, but combine the advantages of multiple layers with temporal multiplexing for all other cases.

In a prototype of this invention (with three LCD layers and a uniform backlight), a minimum of 50 iterations is usually needed to ensure high image fidelity, but about 6 to 12 time-multiplexed frames achieve a high image quality even for a challenging scene exhibiting a large depth of field. In this prototype, light fields with uncorrelated views, such as Arabic numerals, can be successfully synthesized using the proposed low-rank tensor factorization.

In a test of this prototype (with three LCD layers and a uniform backlight): (i) low image quality can be achieved due to a large depth of field; (ii) low-rank approximations using 6 and 12, respectively, time-multiplexed frames create a visually appealing approximation of the light field; and (iii) higher-rank factorizations do not improve image quality significantly, demonstrating that light field tensors are inherently of low rank.

Figure 10:
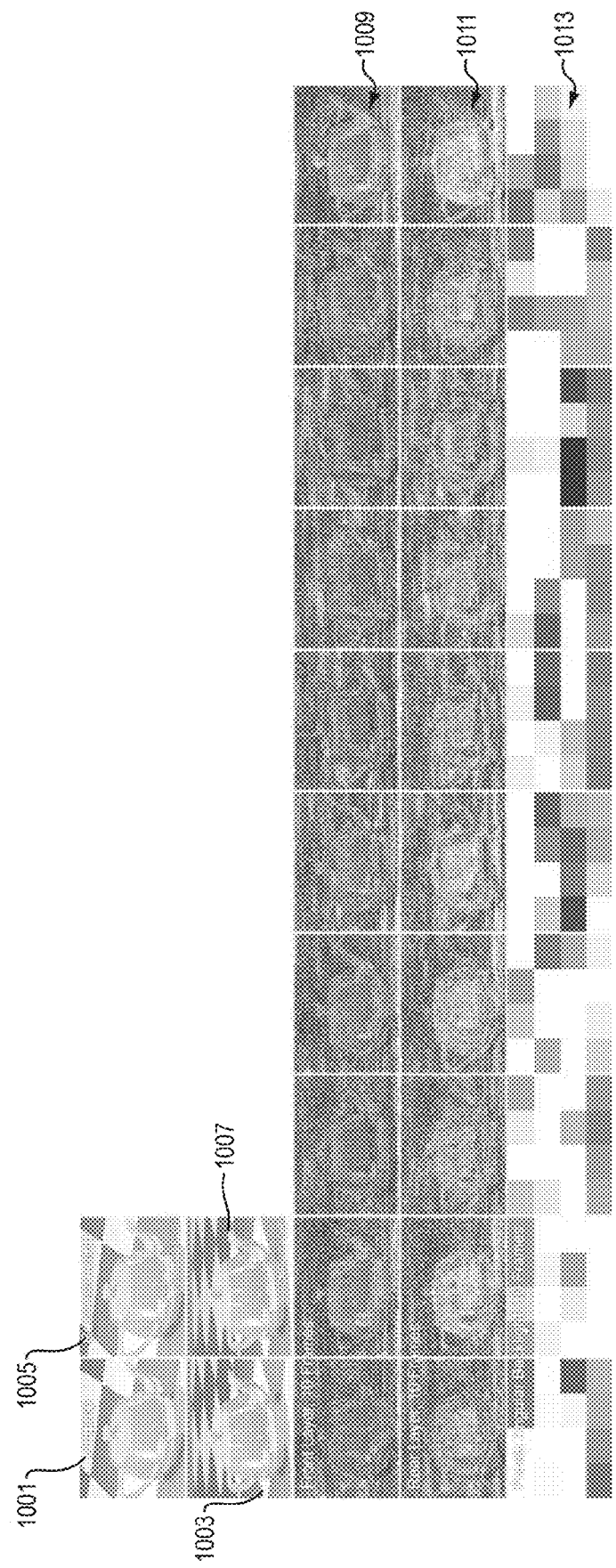
FIG. 10 shows multilayer decompositions of a scene, using a directional backlight.

FIG. 10 shows multilayer decompositions of a scene, using a directional backlight. A directional backlight adds more degrees of freedom that increase the field of view and depth of field of the tensor display.

Specifically, FIG. 10 shows decomposition for dual-layer display containing a purely angular backlight behind the rear layer. The original light field has 4×4 views within a field of view of 30°. Two of the original views are shown on the upper left 1001, 1003 with corresponding reconstructions 1005, 1007 next to them. This data set represents a rank-16 light field, which is decomposed using 10 frames. The two layers are separated by a distance that corresponds to the separation distance for an equivalent parallax barrier display. Each frame is shown for the front layer (row 1009), for the rear layer (row 1011), and for the angular backlight (row 1013). The layer decompositions resemble what NMF produces for dual-layer setups, but adds an angular backlight for improved depth of field and field of view.

DEFINITIONS AND CLARIFICATIONS

Here are a few definitions and clarifications. As used herein:

The terms "a" and "an", when modifying a noun, do not imply that only one of the noun exists. For example, if "a" ball exists, this does not imply that only one ball exists.

A display is "automultiscopic" if it produces a 3D image that can be perceived by a human not wearing glasses or other optical apparatus. The 3D image produced by an automultiscopic display, when viewed by a human not wearing glasses or other optical devices: (i) includes multiple views, the view seen depending on the angle at which the image is viewed, (ii) exhibits binocular disparity; and (iii) exhibits motion parallax in both horizontal and vertical directions.

A "backlight" provides illumination for one or more transmissive components of a display device. The transmissive components are optically closer to a viewer, compared to the backlight, which is optically further from the viewer.

The term "comprise" (and grammatical variations thereof) shall be construed broadly, as if followed by "without limitation". If A comprises B, then A includes B and may include other things.

A backlight is "directional" if it is configured to output light at an angle, relative to a display surface of the backlight, that can vary at different times. Here are some examples of "directional" backlights: (i) In a simple implementation, a directional backlight may comprise an array of light-emitting devices behind a lens, where the different light-emitting devices are configured to be turned on one at a time, causing light to exit the front of the lens at an angle that varies over time. (ii) In some cases, a directional backlight may include a layer comprising more than one pixel, the angle of light outputted by each pixel in that layer being separately controllable. (iii) In some cases, a directional backlight may output light at multiple angles at the same time. (iv) In some cases, a directional backlight may include a layer comprising a spatial attenuator, the attenuation caused by each pixel in that layer being separately controllable.

The term "e.g." means including without limitation.

To minimize the "error" between two things is to minimize a measure of (or based on) the difference between the two things. For example, a solution to a least squares problem may minimize the error between an actual and a target light field, in a least squared sense.

The fact that an "example" or multiple examples of something are given does not imply that they are the only instances of that thing. An example (or a group of examples) is merely a non-exhaustive and non-limiting illustration.

Unless the context clearly indicates otherwise: (1) a phrase that includes "a first" thing and "a second" thing does not imply an order of the two things (or that there are only two of the things); and (2) such a phrase is simply a way of identifying the two things, respectively, so that they each can be referred to later with specificity (e.g., by referring to "the first" thing and "the second" thing later). For example, unless the context clearly indicates otherwise, if an equation has a first term and a second term, then the equation may (or may not) have more than two terms, and the first term may occur before or after the second term in the equation. A phrase that includes "a third" thing, a "fourth" thing and so on shall be construed in like manner.

The "flicker fusion frequency", as used herein, means 30 Hz.

In the context of a display device (and components of the device), "front" is optically closer to a viewer, and "rear" is optically further from the viewer, when the viewer is viewing a display produced by the device during normal operation of the device. The "front" and "rear" of a display device continue to be the front and rear, even when no viewer is present. Similar terms, such as "behind", shall be construed in like manner.

The terms "horizontal" and "vertical" shall be construed broadly. For example, "horizontal" and "vertical" may refer to two arbitrarily chosen coordinate axes in a Euclidian two dimensional space.

The term "include" (and grammatical variations thereof) shall be construed broadly, as if followed by "without limitation".

"Intensity" shall be construed broadly to include any measure of or related to intensity, energy or power. For example, the "intensity" of light includes any of the following measures: irradiance, spectral irradiance, radiant energy, radiant flux, spectral power, radiant intensity, spectral intensity, radiance, spectral radiance, radiant exitance, radiant emittance, spectral radiant exitance, spectral radiant emittance, radiosity, radiant exposure and radiant energy density.

As used herein, the "number" of spatially addressable, light attenuating layers in a display device does not count any such layers that are part of a directional backlight that illuminates the display. For example, if the only spatially addressable, light attenuating layers in a display device are (1) a front LCD layer and (2) an LCD layer that is part of a directional backlight, then the "number" of such spatially addressable, light attenuating layers is treated as one.

The term "or" is an inclusive disjunctive. For example "A or B" is true if A is true, or B is true, or both A or B are true.

"NTF" means nonnegative tensor factorization. The "order" (or "dimension") of a tensor is the minimum number of indicia needed to uniquely identify a component of the tensor.

A parenthesis is simply to make text easier to read, by indicating a grouping of words. A parenthesis does not mean that the parenthetical material is optional or can be ignored.

Persistence of vision is not a "perception error metric", as used herein.

To vary something "per pixel" means to vary it at respective pixels. Something may vary "per pixel" even if it varies only at some, but not all, of the pixels in a set of pixels. Similar terms (e.g. "on a per pixel basis") shall be construed in like manner.

A "pixel" includes the smallest addressable element in a display device. For example, a light-transmitting or light-emitting display device may have pixels.

The "rank" of a tensor $\mathcal{L}$ is the minimum number of simple tensors with which it is possible to express $\mathcal{L}$ as a sum.

A "simple tensor" can be completely factorized into vectors.

A "single-layer" display using directional backlighting can be implemented in multiple ways. For example, a "single-layer" display using directional backlighting may comprise a single LCD layer and a purely angular backlight. Or, for example, a "single-layer" display using directional backlighting may comprise both (1) a front LCD layer and (2) a directional backlight, where the directional backlight itself includes another LCD layer. The phrase "single-layer" is used to indicate that there is only one spatially addressable light attenuating layer, not counting any such layer in the directional backlight. Similar phrases (however worded) regarding a single layer (or single LCD) and a directional backlight shall be construed in like manner.

The term "sparse" shall be construed broadly. For example, in a conventional context, a tensor is "sparse" if a majority of the tensor components are zero. This allows significant data compression, zeros being insignificant data that is not stored. Of course, in an unconventional binary system, a conventional zero may be replaced with another value. More generally, a tensor is "sparse" if it functions in a manner equivalent to a conventional sparse tensor. For example, a tensor is "sparse" if a majority of its components are a value that is treated as insignificant data for compression purposes.

A display layer is "time-multiplexed" if it is configured to display a sequence of frames at a rate equal to or faster than the flicker fusion frequency. For example, a display layer that is configured to display a sequence of frames at a rate of 60 Hz (60 frames per second) is time-multiplexed.

A "tensor display" is an automultiscopic display device wherein: (1) the device includes one or more spatially addressable, light attenuating layers; (2) the device includes a controller, which is configured to perform calculations to control the device; and (3) the calculations involve using weighted NTF.

A backlight is "uniform" if it is not directional.

Notation

Here are examples of mathematical notation (e.g., font, capitalization, and math symbols) used herein:

a is a scalar;
a is a vector;
A is a matrix;
$\chi$ is a tensor;
$\chi_{(i)}$ is matricization (unfolding) of tensor $\chi$ along mode i;
$\chi \times_i A = AX_{(i)}$ is a tensor-matrix product along mode i;
a∘b is a vector outer product;
A●B is a Hadamard matrix product (elementwise product);
A◇B is a Hadamard matrix division (elementwise division);
A$\hat{\times}$B is a Kronecker product of two matrices A, B;
$A_{\hat{\times}} = A^{(N)} \hat{\times} \ldots \hat{\times} A^{(1)}$ is a Kronecker product of N matrices $A^{(N)}, \ldots, A^{(1)}$;
$A_{\hat{\times}}{}^n = A^{(N)} \hat{\times} \ldots \hat{\times} A^{(n+1)} \hat{\times} A^{(n-1)} \hat{\times} \ldots \hat{\times} A^{(1)}$ is a Kronecker product of N−1 matrices $A^{(N)}, \ldots, A^{(1)}$, skipping $A^{(n)}$;
A⊙B is a Khatri-Rao product of two matrices;
$A_{\odot} = A^{(N)} \odot \ldots \odot A^{(1)}$ is a Khatri-Rao product of N matrices $A^{(N)}, \ldots, A^{(1)}$; and
$A_{\odot}{}^n = A^{(N)} \odot \ldots \odot A^{(n+1)} \odot A^{(n-1)} \odot \ldots \odot A^{(1)}$ is a Khatri-Rao product of N−1 matrices $A^{(N)}, \ldots, A^{(1)}$, skipping $A^{(n)}$.

Variations:

This invention may be implemented in many different ways. Here are some non-limiting examples.

This invention may be implemented as a method comprising, in combination: (a) using a backlight to provide light to a display device, which display device includes one or more spatially addressable, light attenuating layers; (b) using the layers to display a temporal sequence of frames; and (c) using one or more processors (i) to perform an optimization calculation to compute, for each respective frame in the sequence and each respective layer in the one or more layers, attenuation of the light at respective pixels of the respective layer; and (ii) to output control signals to control the attenuation; wherein (I) the optimization calculation includes at least one mathematical operation an $N^{th}$-order, rank-M tensor, where M is equal to the number of frames in the sequence, and N is equal to the number of the layers, if the backlight is uniform, and N is equal to the number of the layers plus one, if the backlight is directional, (II) the optimization calculation includes applying a weighted nonnegative tensor factorization, and (III) either (A) the backlight is uniform and the number of the layers is at least three or (B) the backlight is directional and the number of the layers is at least one. Furthermore: (1) the backlight may be directional; (2) the backlight may be directional and the number of the layers may be at least two; (3) the backlight may be uniform and the number of the layers may be at least three; (4) the tensor may be sparse. The display device may be configured to produce an automultiscopic display. The automultiscopic display may have one or more fields of view; the display device may have a front display surface; each respective field of view, out of the one or more fields of view, may be centered about a viewing axis; and the method may further comprise dynamically varying the viewing axis of each field of view, respectively, including to orientations that are not normal to the front display surface, and tracking gaze or head position of a human user of the display device.

This invention may be implemented as apparatus comprising, in combination: (a) a display device, which display device includes one or more spatially addressable, light attenuating layers, which layers are configured to display a temporal sequence of frames; (b) a backlight, the backlight being configured to provide light to the display device; and (c) one or more processors, the one or more processors being configured (i) to perform an optimization calculation to compute, for each respective frame in the sequence and each respective layer in the one or more layers, attenuation of the light at respective pixels of the respective layer; and (ii) to output control signals to control the attenuation; wherein (I) the backlight is directional and the number of the layers is at least one, (II) the optimization calculation includes at least one mathematical operation on an rank-M tensor, M being equal to the number of frames in the sequence, and (III) the optimization calculation includes applying a weighted nonnegative tensor factorization. The backlight may be directional and the tensor may have an order equal to N+1, where N is the number of the layers. The backlight may comprise a lens and a spatially addressable light modulating layer; the lens may have a focal length; and the light modulating layer may be positioned at a distance from the lens, which distance is equal to the focal length. The backlight may be directional and the number of the layers may be equal to at least two. The display device may be configured to produce an automultiscopic display. The tensor may be sparse. The optimization calculation may optimize based at least in part on perception error metrics. The optimization calculation may calculate a set of per pixel attenuations, which set minimizes error between a light field transmitted from the display device and a light field that would be created by a target 3D scene. At least one of the layers may comprise both (i) optical elements configured to transmit light and (ii) optical elements configured to emit light.

This invention may be implemented as apparatus comprising, in combination: (a) a display device, which display device includes one or more spatially addressable, light attenuating layers, the layers being configured to display a temporal sequence of frames; (b) a backlight, the backlight being configured to provide light to the display device; and (c) one or more processors, the one or more processors being configured (i) to perform an optimization calculation to compute, for each respective frame in the sequence and each respective layer in the one or more layers, attenuation of light at respective pixels of the respective layer; and (ii) to output control signals to control the attenuation; wherein (I) the backlight is uniform, (II) the optimization calculation includes at least one mathematical operation on an $N^{th}$-order, rank-M tensor, M being equal to the number of frames in the sequence and N being equal to the number of the layers, (III) the optimization calculation includes applying a weighted nonnegative tensor factorization, and (IV) the number of the layers is at least three. The display device may be configured to produce an automultiscopic display, which display concurrently has one or more fields of view; the display device may have a front display surface; each respective field of view, out of the one or more fields of view, may be centered about a viewing axis; and (d) the display device may be configured to dynamically vary the viewing axis of each field of view, respectively, including to orientations that are not normal to the front display surface. The apparatus may be configured to track gaze or head position of a human user of the display device. The tensor may be sparse.

It is to be understood that the methods and apparatus that are described above and below are merely illustrative applications of the principles of the invention. Numerous modifications may be made by those skilled in the art without departing from the scope of the invention.

Pseudocode:

The following pseudocode documents a GPU-based implementation of nonnegative tensor factorization for tensor displays. all underlying operators for this particular application map well to functions of the fixed graphics pipeline. NTF is implemented using OpenGL and a set of CG shaders.

The pseudocode is designed for a tensor display consists of L light-attenuating layers, each displaying F frames in rapid succession. An optional, low-resolution directional backlight is also supported. Both the original light field and the backlight are assumed to consist of V different views. As the display of the decomposed layers is a time-critical operation, requiring a frame rate that matches the monitor refresh rate, it is implemented in a different thread than the decomposition, which can be run at a lower frame rate. The separate decomposition thread updates the light field at interactive frame rates and decomposes it into a set of L layers, each with F different time frames, and an additional directional backlight with V views and F time frames.

The pseudocode documents the main display loop (i.e., the algorithm titled NTF—Main Display Routines) for synchronized rendering of temporally-multiplexed layers and the backlight with monitor refresh rates. This implementation assumes that calibrated interlacing masks are available for each view of the light field. These masks are multiplied by the corresponding rendered view and added together to generate an interlaced image to be displayed behind a lenslet array.

Decomposition routines (e.g., the algorithm titled NTF—Content-Updating Thread) are also documented, implementing weighted nonnegative tensor factorization.

```
Algorithm: NTF - Main Display Routines
variables FBO_LAYERS[ L ][ F ], FBO_BACKLIGHT[ V ][ F ],
    INTERLACING_MASKS[ V ], f = 0, UseBacklight=true
function mainDisplayLoop
    // draw layers of current frame
    for all layers l
        set viewport for l
        activate FBO_LAYERS[l][f]
        draw textured 2D quad
    end
    // draw backlight of current frame
    If bUseBacklight
        set viewport for backlight
        activate accumulation buffer
        for all views v
            activate CG_SHADER_MULTIPLY_TWO_TEXTURES
                (INTERLACING_MASK[v], FBO_BACKLIGHT[v][f])
            draw textured 2D quad
        end
        deactivate accumulation buffer
    end
    // cycle through frames
    f = (f < F) ? f +1 : 0;
end
Algorithm NTF - Content-Updating Thread
variables FBO_LF[V], FBO_LF_REC[V], FBO_LF_TMP[V],
    FBO_LAYER_TMP[2], FBO_TMP\\
function threadDisplayLoop( )
    // draw light field
    for all light field views v
        activate FBO_LF[v]
        set perspective v
        drawScene( ); // render desired 3D scene (e.g., a teapot)
    end
    // factorize light field using NTF
    NTF( );
end
function NTF( )
    for all iterations i
        // update the layers
        for all layers l
            // draw current estimate of LF into rec buffers
            drawLightFieldFromLayersRec( );
            for all frames f
                // draw layers into LF tmp buffers, but leave out current layer
                drawLightFieldFromLayersTmp(l);
```

```
            // compute numerator for multiplicative NTF update
            activate FBO_LAYER_TMP[1]
            activate accumulation buffer
            for all light field views v
                set perspective i as projective texture matrix
                activate
                CG_SHADER_MULT2TEXTURES_AND_PROJECTIVE_TEX
                MAPTHEM( FBO_LF[v], FBO_LF_TMP[v] )
                draw 2D quad
            end
            deactivate FBO_LAYER_TMP[1]
            // compute denominator for multiplicative NTF update
            activate FBO_LAYER_TMP[2]
            activate accumulation buffer
            forall light field views v
                set perspective i as protective texture matrix
                activate
                CG_SHADER_MULT2TEXTURES_AND_PROJECTIVE_TEX
                MAPTHEM( FBO_LF_REC[v], FBO_LF_TMP[v] )
                draw 2D quad
            end
            deactivate FBO_LAYER_TMP[2]
            // update current layer for current frame
            activate FBO_LAYERS[l][f]
            activate CG_SHADER_MULT2TEXTURES_DIVIDEBYOTHER
            (FBO_LAYERS[l][f], FBO_LAYER_TMP[1],
            FBO_LAYER_TMP[2])
            draw 2D quad
            deactivate FBO_LAYERS[l][f]
        end
    end
    // update the backlight
    If bUseBacklight
        // draw current estimate of LF into rec buffers
        drawLightFieldFromLayersRec( );
        for all frames f
            // draw layers into LF tmp buffers, but leave out backlight
            drawLightFieldFromLayersTmp( );
            for all views v
                set perspective i as protective texture matrix
                // compute numerator for multiplicative NTF update
                activate FBO_BL_TMP[1]
                activate
                CG_SHADER_MULT2TEXTURES_AND_PROJECTIVE_TEX
                MAPTHEM( FBO_LF[v], FBO_LF_TMP[v] )
                draw 2D quad
                deactivate FBO_BL_TMP[1]
                // compute denominator for multiplicative NTF update
                activate FBO_BL_TMP[2]
                activate
                CG_SHADER_MULT2TEXTURES_AND_PROJECTIVE_TEX
                MAPTHEM( FBO_LF_REC[v], FBO_LF_TMP[v] )
                draw 2D quad
                deactivate FBO_BL_TMP[2]
                // downsample the backlight TMP FBOs to backlight resolution by
                adding up the values
                downsampleAndAdd(FBO_BL_TMP[1,2]);
                // update current backlight view for current frame
                activate FBO_BL[v][f]
                activate CG_SHADER_MULT2TEXTURES_DIVIDEBYOTHER
                ( FBO_BL[v][f], FBO_BL_TMP[1], FBO_BL_TMP[2] )
                draw 2D quad
                deactivate FBO_BL[v][f]
            end
        end
    end
end
end
Algorithm NTF - Additional Helper Functions
function drawLightFieldFromLayersRec( )
    convertAllLayersAndBacklightToLOG( );
    for all views v
        for all frames f
            activate FBO_TMP
            activate accumulation buffer
            for all layers l
                draw layer l, textured with FBO_LAYERS[l][f]
            end
            If bUseBacklight
```

-continued

```
                    draw backlight, textured with FBO_BACKLIGHT[v][f]
                end
                deactivate FBO_TMP
                activate FBO_LF_REC[v]
                activate accumulation buffer
                activate CG_SHADER_DRAW_EXPONENTIAL_TEXTUE (FBO_TMP)
                deactivate FBO_LF_REC[v]
            end
        end
        convertAllLayersAndBacklightFromLOG( );
    end
    function drawLightFieldFromLayersTmp(int leaveOutLayerX)
        convertAllLayersAndBacklightToLOG( );
        for all views v
            for all frames f
                activate FBO_TMP
                activate accumulation buffer
                for all layers l
                    If leaveOutLayerX!=l
                        draw layer l, textured with FBO_LAYERS[l][f]
                    end
                end
                If bUseBacklight && (leaveOutLayerX)
                    draw backlight, textured with FBO_BACKLIGHT[v][f]
                end
                deactivate FBO_TMP
                activate FBO_LF_TMP[v]
                activate accumulation buffer
                activate CG_SHADER_DRAW_EXPONENTIAL_TEXTUE ( FBO_TMP )
                deactivate FBO_LF_TMP[v]
            end
        end
        convertAllLayersAndBacklightFromLOG( );
    end
```

What is claimed:

1. A method comprising, in combination:
(a) using a backlight to provide light to a display device, which display device includes one or more spatially addressable, light attenuating layers;
(b) using the layers to display a temporal sequence of frames; and
(c) using one or more processors
   (i) to perform an optimization calculation to compute, for each respective frame in the sequence and each respective layer in the one or more layers, attenuation of the light at respective pixels of the respective layer; and
   (ii) to output control signals to control the attenuation;
wherein
   (I) the optimization calculation includes at least one mathematical operation on an $N^{th}$-order, rank-M tensor, where M is equal to the number of frames in the sequence, and N is equal to the number of the layers, if the backlight is uniform, and N is equal to the number of the layers plus one, if the backlight is directional,
   (II) the optimization calculation includes applying a weighted nonnegative tensor factorization, and
   (III) either (A) the backlight is uniform and the number of the layers is at least three or (B) the backlight is directional and the number of the layers is at least one.

2. The method of claim 1, wherein the backlight is directional.

3. The method of claim 1, wherein the backlight is directional and the number of the layers is at least two.

4. The method of claim 1, wherein the backlight is uniform and the number of the layers is at least three.

5. The method of claim 1, wherein the tensor is sparse.

6. The method of claim 1, wherein the display device is configured to produce an automultiscopic display.

7. The method of claim 6, wherein:
(a) the automultiscopic display has one or more fields of view;
(b) the display device has a front display surface;
(c) each respective field of view, out of the one or more fields of view, is centered about a viewing axis; and
(d) the method further comprises (i) dynamically varying the viewing axis of each field of view, respectively, including to orientations that are not normal to the front display surface, and (ii) tracking gaze or head position of a human user of the display device.

8. Apparatus comprising, in combination:
(a) a display device, which display device includes one or more spatially addressable, light attenuating layers, which layers are configured to display a temporal sequence of frames;
(b) a backlight, the backlight being configured to provide light to the display device; and
(c) one or more processors, the one or more processors being configured
   (i) to perform an optimization calculation to compute, for each respective frame in the sequence and each respective layer in the one or more layers, attenuation of the light at respective pixels of the respective layer; and
   (ii) to output control signals to control the attenuation;
wherein
   (I) the backlight is directional and the number of the layers is at least one,
   (II) the optimization calculation includes at least one mathematical operation on an rank-M tensor, M being equal to the number of frames in the sequence, and (III) the optimization calculation includes applying a weighted nonnegative tensor factorization.

9. The apparatus of claim 8, wherein the tensor has an order equal to N+1, where N is the number of the layers.

10. The apparatus of claim 9, wherein the number of the layers is equal to at least two.

11. The apparatus of claim 8, wherein:
(a) the backlight comprises a lens and a spatially addressable light modulating layer;
(b) the lens has a focal length, and
(c) the light modulating layer is positioned at a distance from the lens, which distance is equal to the focal length.

12. The apparatus of claim 8, wherein the display device is configured to produce an automultiscopic display.

13. The apparatus of claim 8, wherein the tensor is sparse.

14. The apparatus of claim 8, wherein the optimization calculation optimizes based at least in part on perception error metrics.

15. The apparatus of claim 8, wherein the optimization calculation calculates a set of per pixel attenuations, which set minimizes error between a light field transmitted from the display device and a light field that would be created by a target 3D scene.

16. The apparatus of claim 8, wherein at least one of the layers comprises both (i) optical elements configured to transmit light and (ii) optical elements configured to emit light.

17. Apparatus comprising, in combination:
(a) a display device, which display device includes one or more spatially addressable, light attenuating layers, the layers being configured to display a temporal sequence of frames;
(b) a backlight, the backlight being configured to provide light to the display device; and
(c) one or more processors, the one or more processors being configured
(i) to perform an optimization calculation to compute, for each respective frame in the sequence and each respective layer in the one or more layers, attenuation of light at respective pixels of the respective layer; and
(ii) to output control signals to control the attenuation;
wherein
(I) the backlight is uniform,
(II) the optimization calculation includes at least one mathematical operation on an $N^{th}$-order, rank-M tensor, M being equal to the number of frames in the sequence and N being equal to the number of the layers,
(III) the optimization calculation includes applying a weighted nonnegative tensor factorization, and
(IV) the number of the layers is at least three.

18. The apparatus of claim 17, wherein:
(a) the display device is configured to produce an automultiscopic display, which display concurrently has one or more fields of view;
(b) the display device has a front display surface;
(c) each respective field of view, out of the one or more fields of view, is centered about a viewing axis; and
(d) the display device is configured to dynamically vary the viewing axis of each field of view, respectively, including to orientations that are not normal to the front display surface.

19. The apparatus of claim 18, wherein the apparatus is configured to track gaze or head position of a human user of the display device.

20. The apparatus of claim 17, wherein the tensor is sparse.

* * * * *